US011922763B2

(12) United States Patent
Matsuda

(10) Patent No.: US 11,922,763 B2
(45) **Date of Patent: *Mar. 5, 2024**

(54) GAMING MACHINE, CONTROL METHOD FOR MACHINE, AND A PROGRAM FOR OPERATING GAMING MACHINES TO DISPLAY COMPUTER ANIMATED REEL GAMES

(71) Applicant: Konami Gaming, Inc., Las Vegas, NV (US)

(72) Inventor: Masaya Matsuda, Zama (JP)

(73) Assignee: Konami Gaming, Inc., Las Vegas, NV (US)

( * ) Notice: Subject to any disclaimer, the term of this patent is extended or adjusted under 35 U.S.C. 154(b) by 545 days.

This patent is subject to a terminal disclaimer.

(21) Appl. No.: 17/087,084

(22) Filed: Nov. 2, 2020

(65) Prior Publication Data

US 2021/0280009 A1 Sep. 9, 2021

Related U.S. Application Data

(63) Continuation of application No. 16/152,764, filed on Oct. 5, 2018, now Pat. No. 10,861,283.

(51) Int. Cl.
*G07F 17/32* (2006.01)

(52) U.S. Cl.
CPC ...... *G07F 17/3244* (2013.01); *G07F 17/3209* (2013.01); *G07F 17/3213* (2013.01)

(58) Field of Classification Search
CPC .. G07F 17/3244; G07F 17/34; G07F 17/3213; G07F 17/326
See application file for complete search history.

(56) References Cited

U.S. PATENT DOCUMENTS

| | | | | |
|---|---|---|---|---|
| 5,816,915 | A | 10/1998 | Kadlic | |
| 6,682,420 | B2 * | 1/2004 | Webb | G07F 17/32 463/19 |
| 7,144,322 | B2 * | 12/2006 | Gomez | G07F 17/32 463/16 |
| 2002/0039918 | A1 * | 4/2002 | Anderson | A63F 9/183 463/19 |
| 2004/0018874 | A1 | 1/2004 | Bonney et al. | |
| 2004/0048651 | A1 * | 3/2004 | Vorias | G07F 17/3262 463/20 |

(Continued)

FOREIGN PATENT DOCUMENTS

| | | | |
|---|---|---|---|
| JP | 2016-39888 | A | 3/2016 |
| JP | 2017-55952 | A | 3/2017 |
| WO | 2018/118231 | A1 | 6/2018 |

*Primary Examiner* — Steve Rowland
(74) *Attorney, Agent, or Firm* — Howard & Howard Attorneys PLLC

(57) ABSTRACT

A gaming machine is described herein. The gaming machine includes a control unit programmed display a game screen including a primary game area and a bonus feature event area. The control unit displays the plurality of credit prize symbols in the bonus feature event area with each credit prize symbol being associated with a corresponding special symbol and having an associated credit value. The control unit spins and stops the plurality of virtual reels to display an outcome of the game and determines an amount of credits based on the credit value of each displayed credit prize symbol that is associated with the special symbol displayed in the outcome of the primary game.

13 Claims, 31 Drawing Sheets

(56) References Cited

U.S. PATENT DOCUMENTS

| | | | | |
|---|---|---|---|---|
| 2004/0082374 | A1* | 4/2004 | Maya | G07F 17/32 463/16 |
| 2004/0192431 | A1 | 9/2004 | Singer et al. | |
| 2005/0153767 | A1* | 7/2005 | Gauselmann | G07F 17/32 463/16 |
| 2005/0255903 | A1* | 11/2005 | Jackson | G07F 17/3267 463/16 |
| 2006/0068881 | A1* | 3/2006 | Casey | G07F 17/3265 463/20 |
| 2006/0068893 | A1* | 3/2006 | Jaffe | G07F 17/3244 463/20 |
| 2008/0113753 | A1* | 5/2008 | Nelson | G07F 17/32 463/31 |
| 2008/0194314 | A1* | 8/2008 | Yoshizawa | G07F 17/3202 463/20 |
| 2009/0239631 | A1* | 9/2009 | Aoki | G07F 17/3267 463/43 |
| 2010/0004050 | A1* | 1/2010 | Caputo | G07F 17/3265 463/20 |
| 2010/0240436 | A1* | 9/2010 | Wilson | G07F 17/3267 463/20 |
| 2011/0009178 | A1* | 1/2011 | Gerson | G07F 17/3295 463/25 |
| 2012/0238348 | A1* | 9/2012 | Aoki | G07F 17/3213 463/43 |
| 2014/0051496 | A1 | 2/2014 | Meyer | |
| 2014/0256402 | A1 | 9/2014 | Caputo et al. | |
| 2015/0080095 | A1 | 3/2015 | Nicely | |
| 2015/0141114 | A1* | 5/2015 | Davis | G07F 17/34 463/20 |
| 2015/0262457 | A1* | 9/2015 | Jhanb | G07F 17/3267 463/20 |
| 2015/0356833 | A1 | 12/2015 | Aoki et al. | |
| 2016/0093162 | A1 | 3/2016 | Marston | |
| 2017/0024974 | A1 | 1/2017 | Berman et al. | |
| 2017/0053496 | A1* | 2/2017 | Borissov | G07F 17/3267 |
| 2017/0186267 | A1 | 6/2017 | Prabhu | |
| 2017/0372558 | A1 | 12/2017 | You et al. | |
| 2018/0025589 | A1 | 1/2018 | Luong | |
| 2018/0122184 | A1 | 5/2018 | Wortmann | |
| 2018/0130306 | A1* | 5/2018 | Berman | G07F 17/3258 |
| 2018/0225914 | A1 | 8/2018 | Heenan et al. | |
| 2020/0043280 | A1* | 2/2020 | Walsh | G07F 17/3213 |
| 2020/0226885 | A1* | 7/2020 | Weaver | G07F 17/3276 |

* cited by examiner

92

| 76 | 78 | 80 | 82 | 84 |
|---|---|---|---|---|
| PicB | Wild | PicB | PicD | Trigger |
| Q | Wild | Trigger | 9 | PicA |
| K | Wild | J | 10 | 10 |
| PicA | Q | Q | Trigger | A |
| 9 | 9 | PicD | PicD | PicA |
| J | J | Wild | Q | K |
| K | Trigger | J | A | 10 |
| PicA | PicB | Q | PicA | 9 |
| 9 | 10 | PicA | 10 | PicB |
| Trigger | PicA | A | PicC | Trigger |
| J | PicD | K | PicB | Q |
| PicC | Special | Special | Special | PicC |
| PicA | K | A | PicC | PicB |
| 10 | A | J | PicD | 10 |
| Trigger | PicB | PicB | K | PicD |
| A | Special | Special | Special | A |
| Q | K | PicD | J | PicA |
| PicD | PicD | PicA | Q | K |
| J | A | 10 | PicC | PicD |
| PicA | Special | Special | Special | PicA |

90

112

72

FIG. 4

Primary Game Reel Strip Layout

| Stop Position | 1st reel | 2nd reel | 3rd reel | 4th reel | 5th reel |
|---|---|---|---|---|---|
| 0 | PIC-b | PIC-d | K | 9 | PIC-b |
| 1 | PIC-b | PIC-d | K | PIC-e | PIC-b |
| 2 | J | K | Scatter | PIC-e | 10 |
| 3 | A | Special | 9 | PIC-e | K |
| 4 | 9 | 10 | K | Q | 9 |
| 5 | J | 10 | Special | Special | K |
| 6 | PIC-a | Special | K | Q | PIC-a |
| 7 | PIC-a | A | K | Q | PIC-a |
| 8 | PIC-a | K | Special | Scatter | PIC-a |
| 9 | PIC-a | Special | 10 | J | PIC-a |
| | | | K | J | PIC-a |
| 40 | Q | 9 | | | |
| 41 | 10 | Mixed-Wild | Q | A | 10 |
| 42 | PIC-b | PIC-a | K | 10 | PIC-b |
| 43 | PIC-b | PIC-a | Scatter | 10 | PIC-b |
| 44 | PIC-b | PIC-a | 10 | 9 | PIC-b |
| 45 | J | PIC-a | 9 | Scatter | 10 |
| 46 | 9 | PIC-a | Mixed-Wild | K | 9 |
| | | | J | 9 | 10 |
| 74 | A | J | | | |
| 75 | A | PIC-b | 10 | Mixed-Wild | PIC-b |
| 76 | | PIC-b | PIC-c | PIC-d | PIC-b |
| 77 | | A | PIC-c | PIC-d | PIC-b |
| 78 | | Special | 10 | K | A |
| 79 | | J | Special | Special | Q |
| 80 | | 10 | Q | 9 | J |
| 81 | | Scatter | A | PIC-c | J |
| 82 | | A | Scatter | PIC-c | PIC-c |
| 83 | | | Q | 10 | PIC-c |
| | | | | Special | PIC-c |

FIG. 15

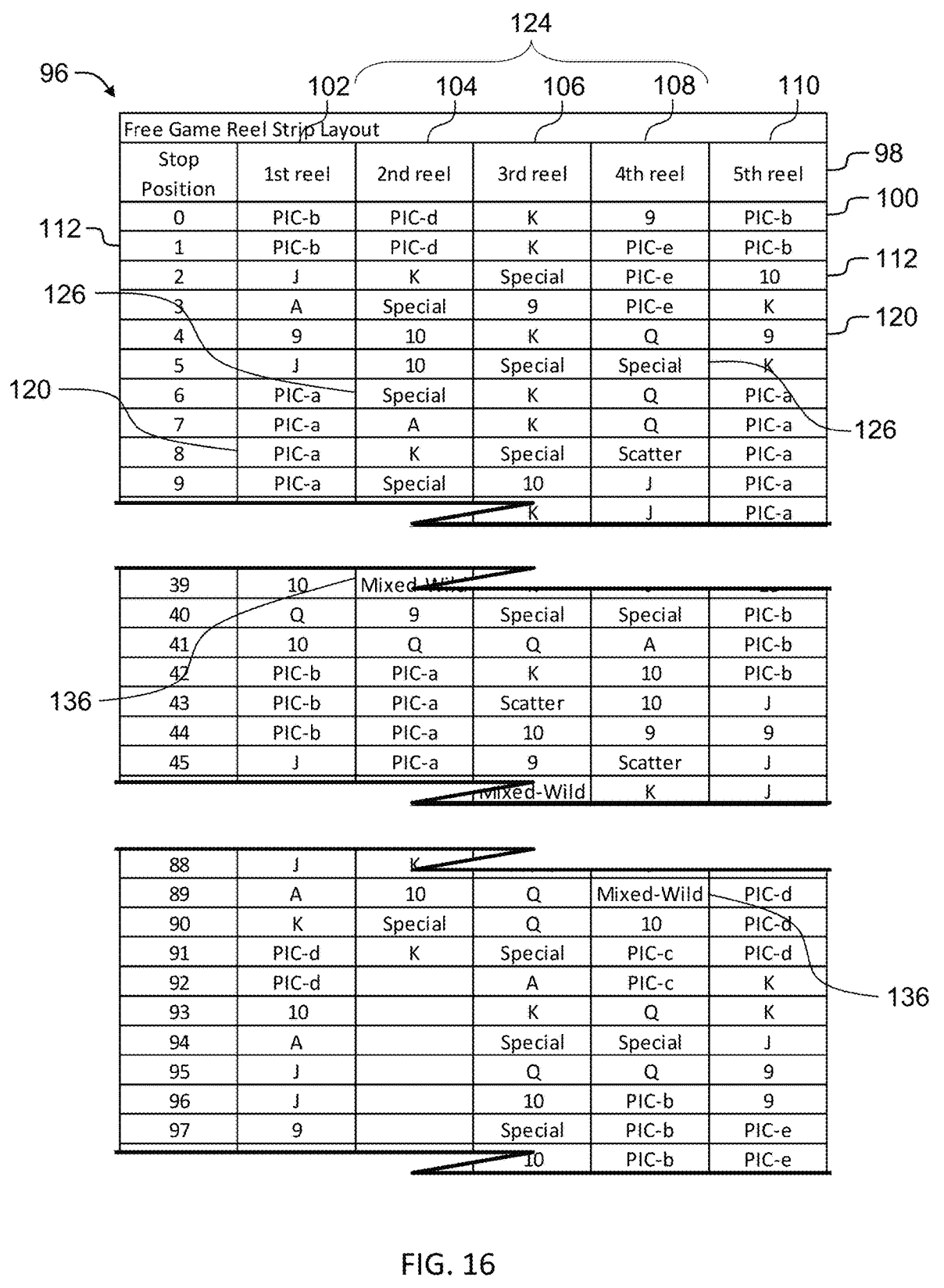

Free Game Reel Strip Layout

| Stop Position | 1st reel | 2nd reel | 3rd reel | 4th reel | 5th reel |
|---|---|---|---|---|---|
| 0 | PIC-b | PIC-d | K | 9 | PIC-b |
| 1 | PIC-b | PIC-d | K | PIC-e | PIC-b |
| 2 | J | K | Special | PIC-e | 10 |
| 3 | A | Special | 9 | PIC-e | K |
| 4 | 9 | 10 | K | Q | 9 |
| 5 | J | 10 | Special | Special | K |
| 6 | PIC-a | Special | K | Q | PIC-a |
| 7 | PIC-a | A | K | Q | PIC-a |
| 8 | PIC-a | K | Special | Scatter | PIC-a |
| 9 | PIC-a | Special | 10 | J | PIC-a |
| | | | K | J | PIC-a |
| 39 | 10 | Mixed-Wi | | | |
| 40 | Q | 9 | Special | Special | PIC-b |
| 41 | 10 | Q | Q | A | PIC-b |
| 42 | PIC-b | PIC-a | K | 10 | PIC-b |
| 43 | PIC-b | PIC-a | Scatter | 10 | J |
| 44 | PIC-b | PIC-a | 10 | 9 | 9 |
| 45 | J | PIC-a | 9 | Scatter | J |
| | | | Mixed-Wild | K | J |
| 88 | J | K | | | |
| 89 | A | 10 | Q | Mixed-Wild | PIC-d |
| 90 | K | Special | Q | 10 | PIC-d |
| 91 | PIC-d | K | Special | PIC-c | PIC-d |
| 92 | PIC-d | | A | PIC-c | K |
| 93 | 10 | | K | Q | K |
| 94 | A | | Special | Special | J |
| 95 | J | | Q | Q | 9 |
| 96 | J | | 10 | PIC-b | 9 |
| 97 | 9 | | Special | PIC-b | PIC-e |
| | | | 10 | PIC-b | PIC-e |

FIG. 16

114

| | GAME SYMBOL | IMAGE FILE | DESCRIPTION |
|---|---|---|---|
| 152 | CREDIT SYMBOL 1 | 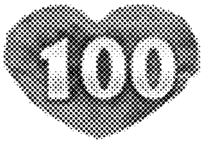 | RED, HEART-SHAPED JEWEL |
| 154 | CREDIT SYMBOL 2 | 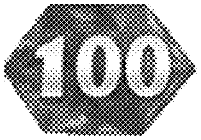 | BLUE, EMERALD-SHAPED JEWEL |
| 156 | CREDIT SYMBOL 3 | 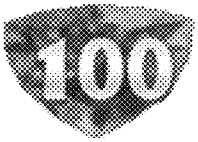 | GREEN, TRILLION-SHAPED JEWEL |

90/146

FIG. 17

116

| | GAME SYMBOL | IMAGE FILE | DESCRIPTION |
|---|---|---|---|
| 130 | Wild 1 |  | GOLD POT, RED, HEART-SHAPED JEWELS |
| 132 | Wild 2 | 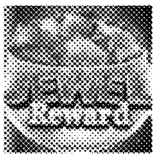 | GOLD POT, BLUE, EMERALD-SHAPED JEWELS |
| 134 | Wild 3 | 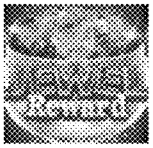 | GOLD POT, GREEN, TRILLION-SHAPED JEWELS |
| 138 | SPECIAL WILD | 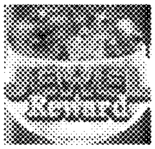 | WHITE POT, RED, BLUE, GREEN JEWELS |

90/128

FIG. 18

122 118 90

| GAME SYMBOL | IMAGE FILE |
|---|---|
| PIC-a | SEVEN |
| PIC-b | CROWN |
| PIC-c | RING |
| PIC-d | BELL |
| PIC-e | COINS |
| A | A |
| K | K |
| Q | Q |
| J | J |
| 10 | 10 |
| 9 | 9 |
| Scatter | MARK |

FIG. 19

129

| | Game Wild Symbol | Selection Probability | Random Number Range |
|---|---|---|---|
| 130 | Wild 1 | 33% | 1-200 |
| 132 | Wild 2 | 33% | 201-400 |
| 134 | Wild 3 | 33% | 401-600 |

FIG. 20

158

| | Credit Prize Symbol | Corresponding Wild Symbol | Selection Probability | Random Number Range |
|---|---|---|---|---|
| 152 | Credit 1 | Wild 1 | 33% | 1-200 |
| 154 | Credit 2 | Wild 2 | 33% | 201-400 |
| 156 | Credit 3 | Wild 3 | 33% | 401-600 |

FIG. 21

140

112

| Stop Position | Random Number Range |
|---|---|
| 1 | 1-50 |
| 2 | 51-100 |
| 3 | 101-150 |
| 4 | 151-200 |
| 5 | 201-250 |
| 6 | 251-300 |
| 7 | 301-350 |
| 8 | 351-400 |
| 9 | 401-450 |
| 10 | 451-500 |
| 11 | 501-550 |
| 12 | 551-600 |
| 13 | 601-650 |
| 14 | 651-700 |
| 15 | 701-750 |
| 16 | 751-800 |
| 17 | 801-850 |
| 18 | 851-900 |
| 19 | 901-950 |
| 20 | 951-1000 |

FIG. 22

144

PAY TABLE

| LINE PAYS | 1 CREDIT WAGERED | | | | |
|---|---|---|---|---|---|
| SYMBOL NAME | 1 SYMBOL | 2 SYMBOLS | 3 SYMBOLS | 4 SYMBOLS | 5 SYMBOLS |
| PIC-a | | | 2 | 25 | 150 |
| PIC-b | | | 2 | 15 | 125 |
| PIC-c | | | 2 | 15 | 125 |
| PIC-d | | | 2 | 10 | 100 |
| PIC-e | | | 2 | 10 | 100 |
| A | | | | 2 | 75 |
| K | | | | 2 | 75 |
| Q | | | | 2 | 75 |
| J | | | | 2 | 25 |
| 10 | | | | 2 | 25 |
| 9 | | | | 2 | 25 |
| SCATTER PAY | MULTIPLIED BY THE LINES PLAYED TIMES BET PER LINE | | | | |
| SYMBOL NAME | 1 SYMBOL | 2 SYMBOLS | 3 SYMBOLS | 4 SYMBOLS | 5 SYMBOLS |
| Scatter | | | 3 | | |

FIG. 24

GAMING MACHINE, CONTROL METHOD FOR MACHINE, AND A PROGRAM FOR OPERATING GAMING MACHINES TO DISPLAY COMPUTER ANIMATED REEL GAMES

CROSS-REFERENCE TO RELATED APPLICATION

This application is a continuation of U.S. patent application Ser. No. 16/152,764, filed Oct. 5, 2018, the disclosure of which is hereby incorporated by reference in its entirety.

TECHNICAL FIELD

The present invention relates to a gaming machine, a control method for a gaming machine, and a program for a gaming machine.

BACKGROUND ART

A gaming machine represented by a slot machine is highly popular among casino customers as a device that provides gaming that is easy to enjoy, and recent statistics report that sales from gaming machines account for the majority of casino earnings. Initial slot machines were simple devices, wherein an inserted coin is received, a configured reel rotates and stops mechanically according to a handle operation, and a win or a loss is determined by a combination of symbols stopped on a single pay line. However, recent gaming machines, such as mechanical slot machines driven by a highly accurate physical reel via a computer controlled stepping motor, video slot machines that display a virtual reel on a display connected to a computer, and various gaming machines that apply similar technology to other casino games are quickly advancing. For the manufacturers that develop these gaming machines, an important theme is to provide an attractive game that strongly attracts casino customers as players, and improves the functionality of the gaming machine.

SUMMARY OF INVENTION

In one aspect of the present invention, a gaming machine is provided. The gaming machine includes a display unit configured to display game screens including computer generated graphics, a memory device storing a game execution program including computer instructions for generating a game including a plurality of virtual reels and a bonus feature including a plurality of credit prize symbols, and a game control unit for executing the game. The game control unit includes a processor that is programmed to execute the game execution program to display a game screen on the display unit including a primary game area and a bonus feature event area. The processor displays the plurality of virtual reels in the primary game area and displays the plurality of credit prize symbols in the bonus feature event area. Each credit prize symbol is classified into one of a plurality of types of credit prize symbols and has an associated credit value. Each type of credit prize symbol is associated with a corresponding special symbol that may be displayed in the primary game, respectively. The processor spins and stops each of the plurality of virtual reels to display an outcome of the primary game and detects a trigger condition including a plurality of the special symbols displayed with the outcome. Upon detecting the trigger condition, the processor determines an amount of credits based on the credit value of each displayed credit prize symbol that is associated with the special symbol displayed with the outcome, and provides the player a bonus credit award based on the determined amount of credits. The processor then removes the credit prize symbols associated with the special symbol displayed with the outcome, and randomly replenishes the credit prize symbols in the bonus feature area.

In another aspect of the present invention, one or more non-transitory computer-readable storage media, having computer-executable instructions embodied thereon is provided. When executed by a processor, the computer-executable instructions cause the processor to display a game screen on a display unit including a primary game area and a bonus feature event area. The processor displays the plurality of virtual reels in the primary game area and displays the plurality of credit prize symbols in the bonus feature event area. Each credit prize symbol is classified into one of a plurality of types of credit prize symbols and has an associated credit value. Each type of credit prize symbol is associated with a corresponding special symbol that may be displayed in the primary game, respectively. The processor spins and stops each of the plurality of virtual reels to display an outcome of the primary game and detects a trigger condition including a plurality of the special symbols displayed with the outcome. Upon detecting the trigger condition, the processor determines an amount of credits based on the credit value of each displayed credit prize symbol that is associated with the special symbol displayed with the outcome, and provides the player a bonus credit award based on the determined amount of credits. The processor then removes the credit prize symbols associated with the special symbol displayed with the outcome, and randomly replenishes the credit prize symbols in the bonus feature area.

In still another aspect of the present invention, a mobile computing device is provided. The mobile computing device includes a touch display unit, a memory device, and a processor. The touch display unit is configured to display game screens including computer generated graphics. The memory device stores a game execution program including computer instructions for generating a game including a plurality of virtual reels and a bonus feature including a plurality of credit prize symbols. The processor is programmed to execute the game execution program to display a game screen on the touch display unit including a primary game area and a bonus feature event area. The processor displays the plurality of virtual reels in the primary game area and displays the plurality of credit prize symbols in the bonus feature event area. Each credit prize symbol is classified into one of a plurality of types of credit prize symbols and has an associated credit value. Each type of credit prize symbol is associated with a corresponding special symbol that may be displayed in the primary game, respectively. The processor spins and stops each of the plurality of virtual reels to display an outcome of the primary game and detects a trigger condition including a plurality of the special symbols displayed with the outcome. Upon detecting the trigger condition, the processor determines an amount of credits based on the credit value of each displayed credit prize symbol that is associated with the special symbol displayed with the outcome, and provides the player a bonus credit award based on the determined amount of credits. The processor then removes the credit prize symbols associated with the special symbol displayed with the outcome, and randomly replenishes the credit prize symbols in the bonus feature area.

BRIEF DESCRIPTION OF DRAWINGS

FIG. 4 is an illustration of virtual reels that may be used with the game shown in FIGS. 3A-3B, according to an embodiment of the present invention.

FIG. 15 is an illustration of exemplary reel strip data file for use in generating virtual reels shown in FIG. 4 with symbol arrangements showing the order of symbols displayed on the display area of the game illustrated in FIGS. 3A-3B, according to an embodiment of the present invention.

FIG. 16 is another illustration of an exemplary reel strip data file for use in generating virtual reels shown in FIG. 4 with symbol arrangements showing the order of symbols displayed on the display area of the game illustrated in FIGS. 3A-3B, according to an embodiment of the present invention.

FIG. 17 is an illustration of a credit prize symbol image data file that may be used with the game shown in FIGS. 3A-3B.

FIGS. 18 and 19 are illustrations of symbol image data files that may be used with the reel strip data files shown in FIGS. 15 and 16 for generating virtual reels, according to an embodiment of the present invention.

FIG. 20 is an illustration of a wild symbol selection data file that may be used with the reel strip data files shown in FIGS. 15 and 16 for generating virtual reels, according to an embodiment of the present invention.

FIG. 21 is an illustration of a credit prize symbol selection data file that may be used with the game shown in FIGS. 3A-3B.

FIG. 22 is an illustration of a reel stop position data file that may be used to execute the game illustrated in FIGS. 3A-3B, according to an embodiment of the present invention.

FIG. 24 is an illustration showing one example of a paytable data file that may be used with the game illustrated in FIGS. 3A-3B.

FIGS. 25A-29D are diagrammatic illustrations of sequences of graphic images that may be used to display the game shown in FIGS. 3A-3B on the display area of the gaming machine in FIGS. 1A-1B and the mobile computer device shown in FIG. 10, according to an embodiment of the present invention.

Corresponding reference characters indicate corresponding parts throughout the drawings.

DETAILED DESCRIPTION OF EMBODIMENTS

Figure 1A:
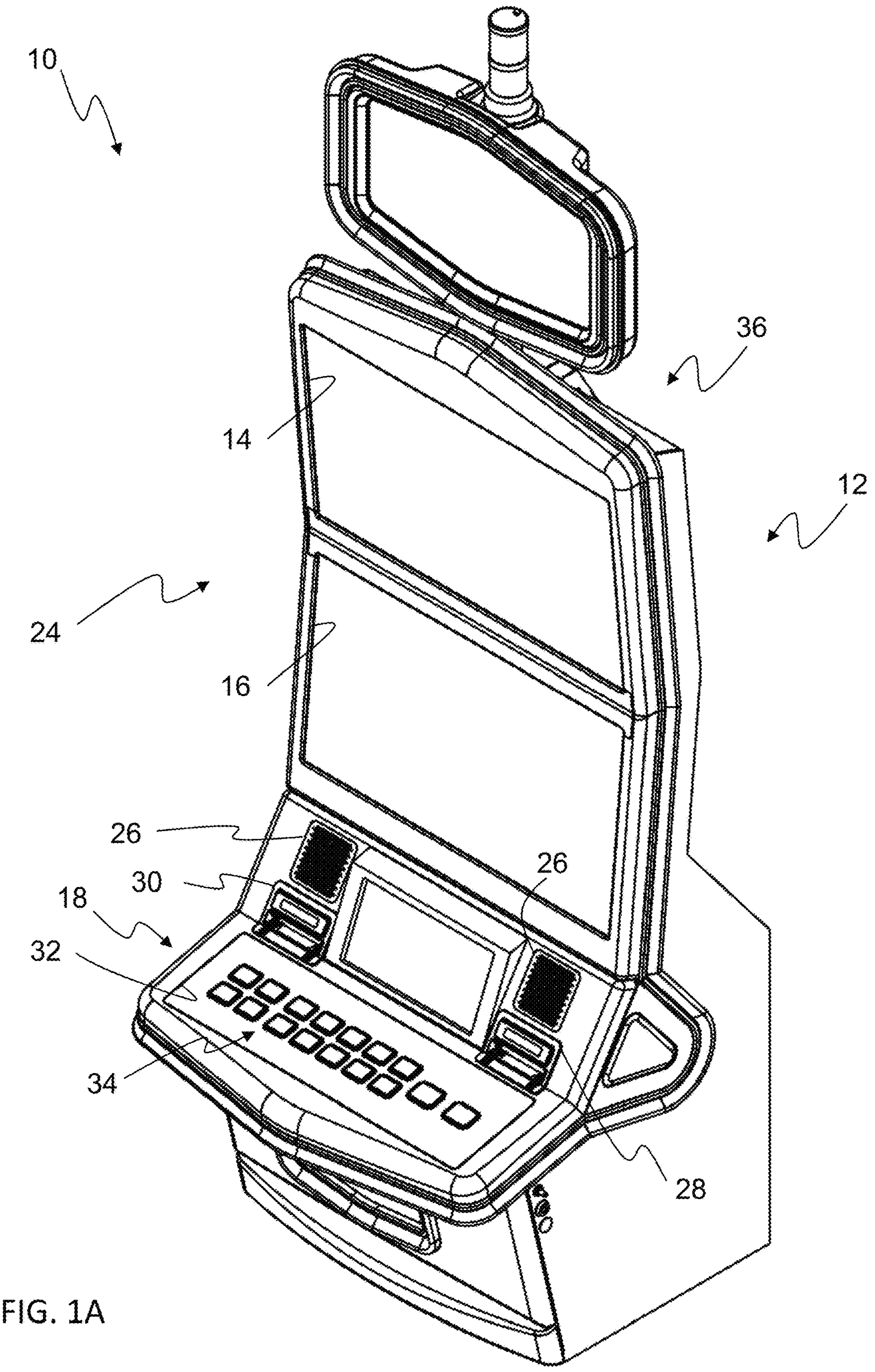
FIG. 1A is a perspective view of the gaming machine, according to the first embodiment.

A gaming machine, according to an embodiment of the present invention, referencing the attached figures is described in detail below. Further, duplicated descriptions will be omitted for identical attached symbols in identical or corresponding parts in each figure.

With reference to the drawings, and in operation, the present invention is directed towards a gaming machine, a control method for a gaming machine, and a program for a gaming machine and/or mobile computing device that provides a game to a player.

The present invention improves the functionality of existing gaming machines by providing a game execution program including computer instructions executed by a processor to operate a game that includes a primary game including a plurality of virtual reels and a bonus feature event that includes a plurality of credit prize symbols. The virtual reels include modifiable symbol positions that are configured to display randomly selected wild symbols. Each credit prize symbol is associated with one of the wild symbols randomly displayed with the virtual reels. The game execution program improves the ability of existing game machines to vary the volatility of game outcomes by using random numbers to select both the wild symbols and the credit prize symbols, and by using credit prize symbols to determine credit awards. Thus, increasing the flexibility of providing bonus credit awards to players during the bonus feature event, and increasing the player's interest in playing the game. In addition, the present invention improves existing gaming machines by providing reel strip layout files that include modifiable symbol positions that allow for varied arrangements of game symbols, thus reducing the amount of computing resources required to render the virtual reels for display.

The gaming machine according to the present embodiment, receives a predetermined game value from the player, generates a game result, and provides a payout to the player according to the game result and one or more pay tables. FIGS. 1A-1D are perspective views and a front view, respectively, of a gaming machine 10, according to the present embodiment. As shown in FIGS. 1A-1D, this gaming machine 10 provides a cabinet 12 providing an upper display 14, a lower display 16, and a control panel 18 and may also house a player tracking or ranking unit 20. The cabinet 12 also houses a game control unit 22 (see FIG. 2) that controls each part (see below). The control unit 22 also implements a random number generator (RNG) that is used during operation of the game. Each configuration is described below.

The upper display 14 and the lower display 16 may be flat panel display devices, such as both liquid crystal display devices and organic EL display devices and the like, and by controlling via each control unit 22, the display area mentioned below functions as a display unit 24 provided to the player. As shown in FIGS. 1C and 1D, the gaming machine 10 may include a unitary display unit 24 that operates as both the upper and lower displays 14, 16.

Speakers 26 are provided on the left and right of the cabinet 12, and by controlling via the control unit 22, sound is provided to the player. On the control panel 18, a bill/ticket identification device 28, a printer device 30, and an operation unit 32 are provided.

The player tracking unit 20 may be housed on the center of the front surface of the cabinet 12 below the lower display 16. The player tracking unit 20 has a card reader that recognizes a player identification card, a display that presents data to the player, and a keypad that receives input by the player. This type of player tracking unit 20 reads information recorded on the player identification card inserted by the player into the card reader, and displays the information and/or information acquired by communicating with the external system on the display, by cooperatively operating with the control unit 22 mentioned below or an external system. Further, input from the player is received by the keypad, the display is changed according to the input, and communication with the external system is carried out as necessary.

The bill/ticket identification device 28 is disposed on the control panel 18 in a state where the insertion opening that a bill/ticket is inserted into is exposed, an identification part that identifies a bill/ticket by various sensors on the inside of the insertion opening is provided, and a bill/ticket storage part is provided on the outgoing side of the identification part. The bill/ticket identification device 28, receives and identifies bills/tickets (including vouchers and coupons) that are the game value as a game executing value, and notifies the control unit 22 mentioned below.

The printer device 30 is disposed on the control panel 18 in a state where the ticket output opening that a ticket is output from is exposed, a printing part that prints predetermined information on a printing paper on the inside of the ticket output opening is provided, and a housing part that houses the printing paper inside the paper inlet side of the printing part is provided. The printer device 30, under the control of the control unit 22 mentioned below, prints information on paper and outputs a ticket according to credit payout processing from the gaming machine 10. The output ticket can use the payout credit as game play by being inserted into the bill/ticket identification device 28 of another gaming machine, or, can be exchanged for cash by a kiosk terminal inside of the casino or a casino cage.

The operation unit 32 receives the operation of the player. The operation unit 32 includes a group of buttons 34 that receives various instructions from the player on the gaming machine 10. The operation unit 32, for example, may include a spin button and a group of setting buttons. The spin button receives an instruction to start (start rotating the reel) an instance of the game. The group of setting buttons 34 includes a group of bet buttons, a group of line-designation buttons, a max bet button, and a payout button and the like. The group of bet buttons receives an instruction operation regarding the bet amount of credits (bet number) from the player. The group of line-designation buttons receive an instruction operation that designate a pay line subjected to a line judgment below from the player. The max bet button receives an instruction operation regarding the bet of the maximum amount of credits that can be bet at one time from the player. The payout button receives an instruction operation instructing a credit payout accumulated in the gaming machine 10. As shown in FIGS. 1C and 1D, in one embodiment, the operation unit 32 may include a touchscreen panel display that displays the graphic computer images of the group of buttons 32 and performs functions similar to the group of buttons 32 including transmitting player selections to the control unit 22. The gaming machine 10 also includes illumination devices 36 that provides decorative lighting to the gaming machine 10.

Figure 1B:
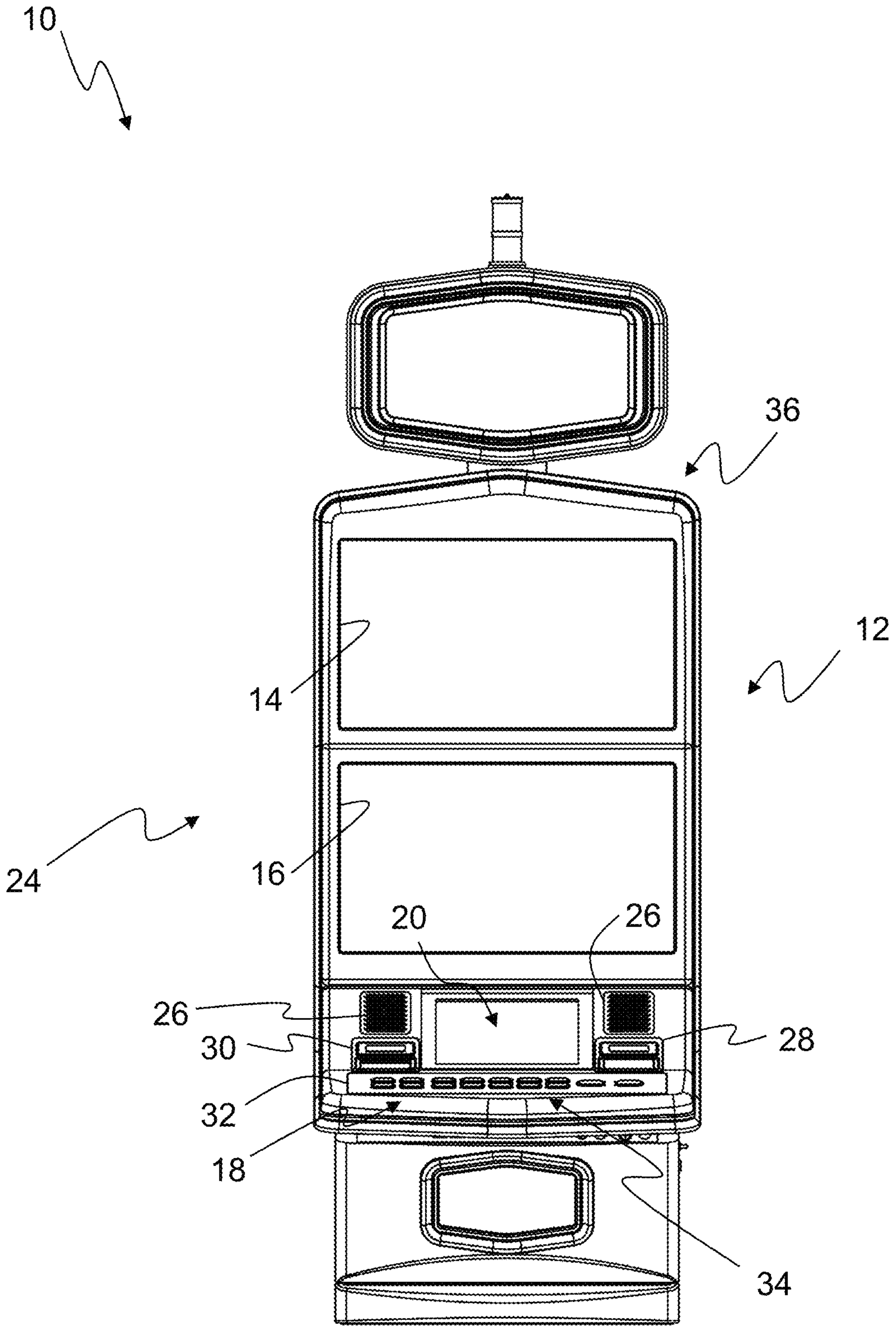
FIG. 1B is a front view of the gaming machine of FIG. 1A.
Figure 1C:
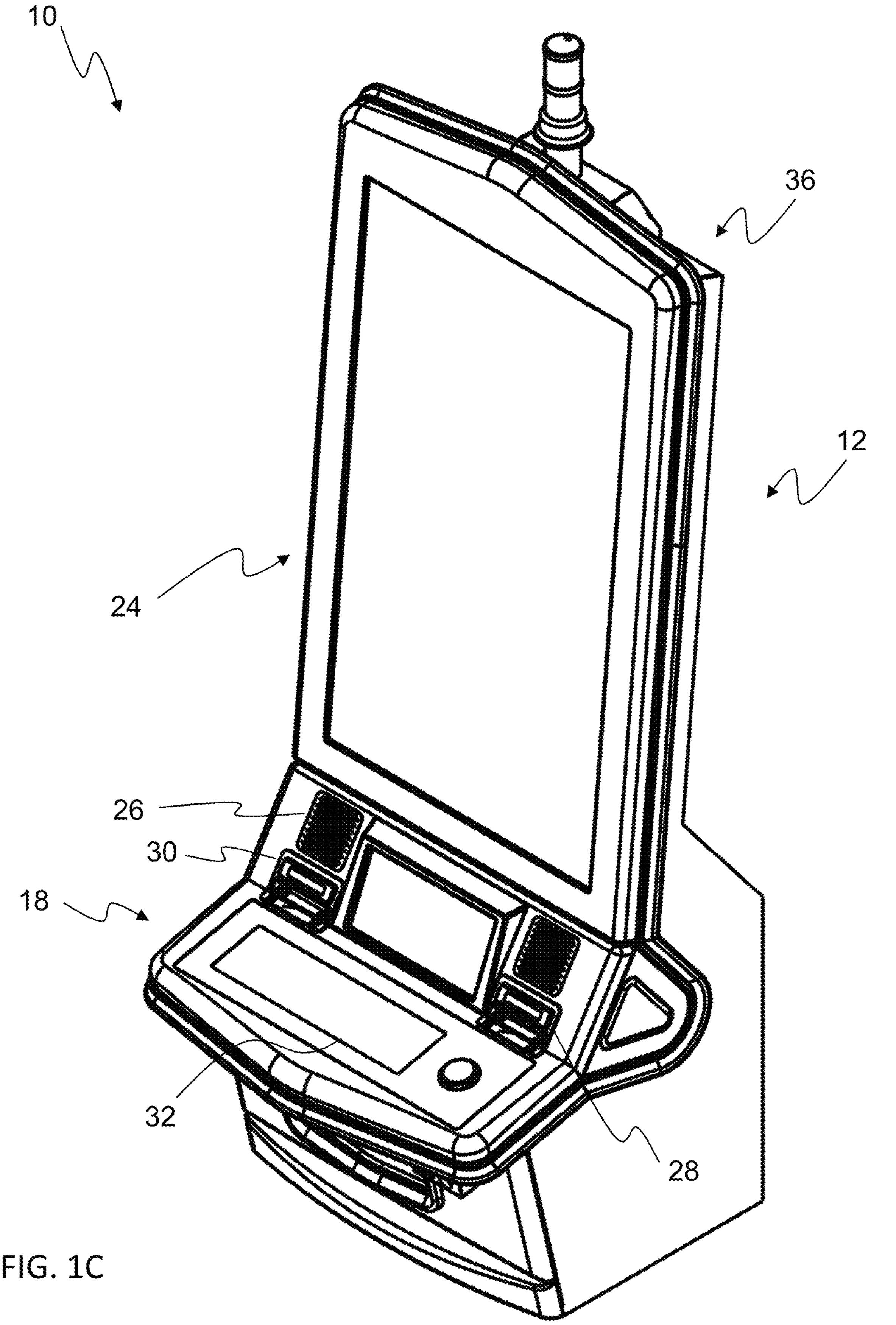
FIG. 1C is another perspective view of the gaming machine shown in FIG. 1A including a unitary display screen and operation unit with touchscreen panel.
Figure 1D:
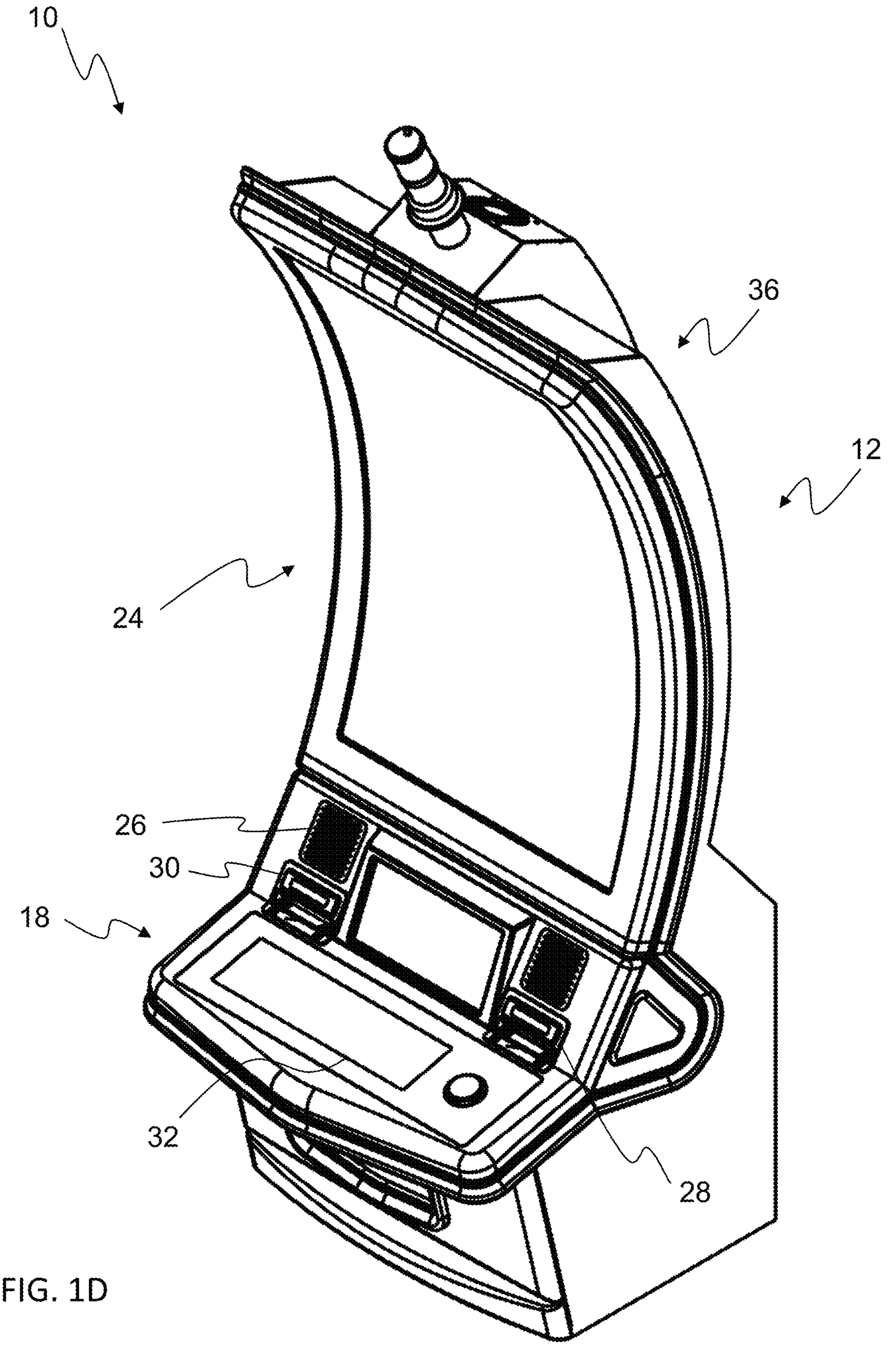
FIG. 1D is another perspective view of the gaming machine shown in FIG. 1A including a curved unitary display screen and operation unit with touchscreen panel.

In one embodiment, referring to FIGS. 1A and 1B, the control panel 18 includes a plurality of user input devices that may include an acceptor device which accepts media associated with a monetary value to establish a credit balance, a validator configured to identify the physical media, a cash-out button actuatable to cause an initiation of a payout associated with the credit balance. The acceptor device may include a touchscreen display associated with the display unit 24 and/or the player tracking unit 20, the paper money/ticket identification device 28, the operation unit 32, the player tracking unit 20, a coin slot, a ticket in ticket out (TITO) system, a bill acceptor, and/or any suitable device that enables the gaming machine 10 to receive media associated with a monetary value and establish a credit balance for use in playing the gaming machine 10. In one embodiment, the acceptor device may be configured to receive physical media such as, for example, a coin, a medal, a ticket, a card, a bill, currency, and/or any suitable physical media that enables the gaming machine 10 to function as described herein. The acceptor device may also be configured to accept virtual media such as, for example, a player tracking account, a virtual credit balance, reward points, gaming credits, bonus points, and/or any suitable virtual media that enables the gaming machine 10 to function as described herein.

For example, in one embodiment, the coin slot may include an opening that is configured to receive coins and/or tokens deposited by the player into the gaming machine 10. The control unit 22 converts a value of the coins and/or tokens to a corresponding amount of gaming credits that are used by the player to wager on games played on the gaming machine 10. The bill acceptor may include an input and output device that is configured to accept a bill, a ticket, and/or a cash card into the bill acceptor to enable an amount of gaming credits associated with a monetary value of the bills, ticket, and/or cash card to be credited to the gaming machine 10. In one embodiment, the bill acceptor also includes a printer (not shown) that is configured to dispense a printed voucher ticket that includes information indicative of an amount of credits and/or money paid out to the player by the gaming machine 10 during a gaming session. The voucher ticket may be used at other gaming devices, or redeemed for cash, and/or other items as part of a casino cashless system.

Figure 2:
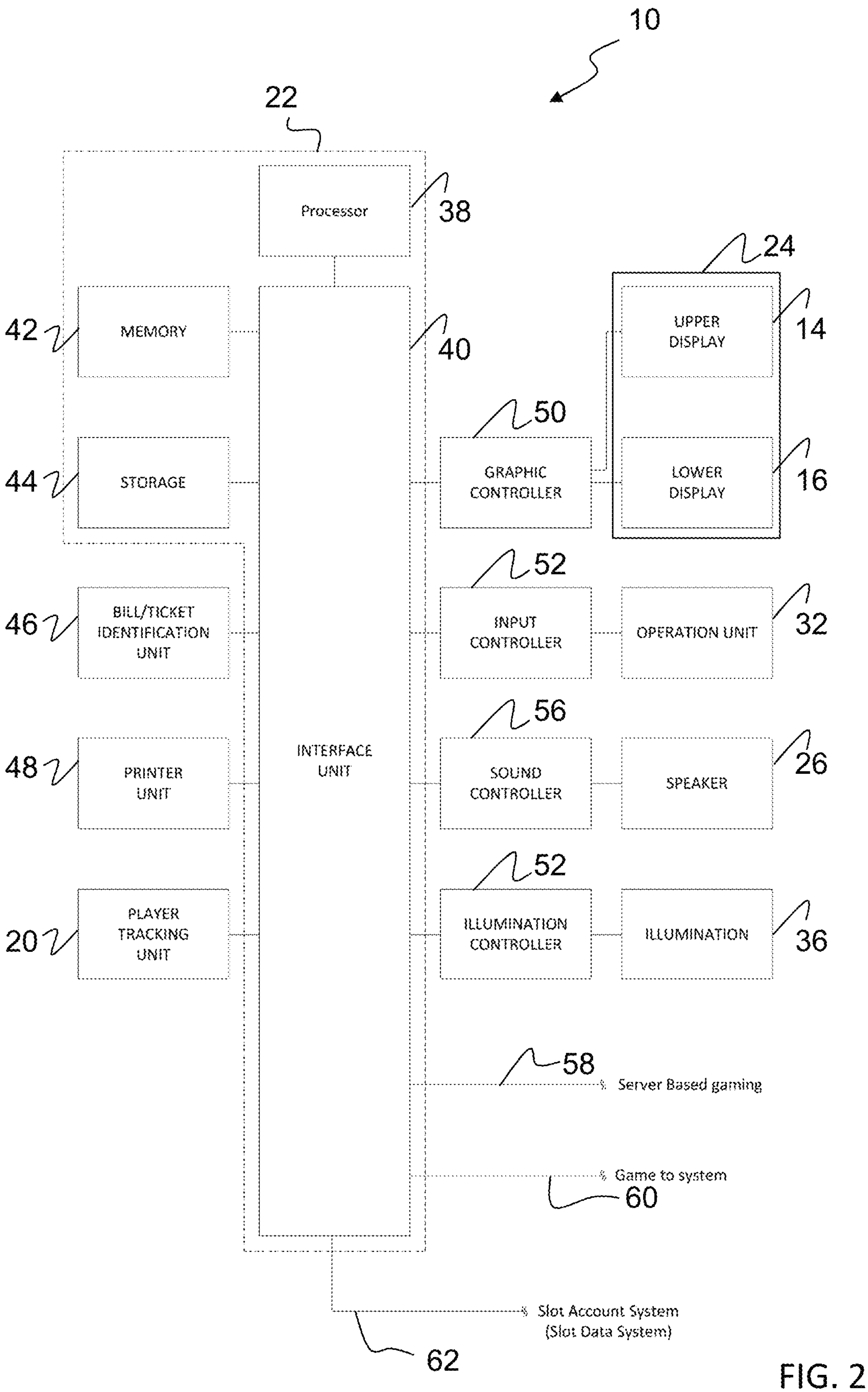
FIG. 2 is a functional block diagram of the gaming machine in FIG. 1A.

With reference to FIGS. 1A, 1B, and 2, further on the inside of cabinet 12, a control board equipped with a central processing unit 38 (abbreviated as CPU below) including a processor that configures the control unit 22, an interface unit (or part) 40, a memory device including a memory 42 and a storage 44, and the like are incorporated. The control board is configured so that communication is possible through the interface unit 40 and each of the components equipped on the cabinet 12, controls the operation of each part by executing the program recorded in the memory 42 or the storage 44 of the CPU 38, and provides a game to the player. The function of the CPU 38 is to execute and display the game on the displays 14, 16 of the gaming machine 10.

FIG. 2 shows a functional block diagram of the gaming machine 10, according to the present embodiment. The gaming machine 10 provides the control unit 22. The control unit 22 is configured as the interface unit 40 including a chip set providing communication functions of the CPU 38, a memory bus connected to a CPU 38, various expanding buses, serial interfaces, USB interfaces, Ethernet (registered trademark) interfaces and the like, and a computer unit where the CPU 38 provides the addressable memory 42 and the storage 44 through the interface unit 40. The memory 42 can be configured to include RAM that is a volatile storage medium, ROM that is a nonvolatile storage medium, and EEPROM that is a rewritable nonvolatile storage medium. The storage 44 provides the control unit 22 as an external storage device function, can use reading devices such as a memory card that is a removable storage medium, and a magneto optical disk and the like, and can use hard disks.

On the interface unit 40, in addition to the CPU 38, the memory 42, and the storage 44, a bill/ticket identification unit controller 46, a printer unit controller 48, the player tracking unit 20, a graphic controller 50, an input controller 52, and a sound controller 54 are connected. That is, the control unit 22 is connected to the operation unit 32 through the input controller 52, and connected to the upper display 14 and/or the lower display 16 through the graphic controller 50. Further, when illumination devices 36 that provides decorative lighting to the gaming machine 10 is provided, the illumination is controlled under the control of the control unit 22 on the interface unit 40, and an illumination controller 56 that controls the illumination devices 36 to provide a decorative lighting effect may be connected.

The control unit 22, which includes memory 42 and storage 44, controls each part by executing a program stored in the memory 42 and the storage 44, and provides a game to the player. Here, for example, the memory 42 and storage 44 may be configured to store a program and data of an operating system and subsystem that provide the basic functions of the control unit 22 to the EEPROM of the memory 42, and stores a program and data of an application that provides a game to the storage 44. According to such a configuration, it can be easy to change or update a game by replacing the storage 44. Further, the control unit 22 may be a multiprocessor configuration that has a plurality of CPUs.

Each block connected to the control unit 22 is described below. The bill/ticket identification unit controller 46 operates the bill/ticket identification device 28 to receive bills/tickets in the insertion opening, and notifies the control unit 22 of identifying information corresponding to the assortment of bills or the payout processing of credits. The bill/ticket identification unit controller 46 notifies the information to the control unit 22, and the control unit 22 increases the usable credit amount inside of the game according to the notified content. The printer unit controller 48 corresponds to the printer device 30, and under the control of the control unit 22 that receives an operation of the payout button of the group of setting buttons 34, information corresponding to the credit payout processing from the gaming machine 10 is printed and output on a printed ticket.

The player ranking (or tracking unit) unit 20 cooperatively operates with the control unit 22, and sends and receives information and the like of the player from the casino management system. The graphic controller 50 controls the display unit 24 including the upper display 14 and the lower display 16, under the control of the control unit 22, and displays a display image that includes various graphic data. The sound controller 54 drives the speakers 26 under the control of the control unit 22, and provides various sounds such as an announcement, sound effects, BGM and the like.

Further, the interface unit 40, has various communication interfaces for communicating with the exterior of the gaming machine 10, for example the interface unit 40 can communicate with an external network by Ethernet 58, 60, and a serial interface 62. In the present embodiment, one example shows when there is communication between a well-known server side gaming network (Server Based Gaming of FIG. 2), a G2S network (Game to System of FIG. 2), and a slot information system (Slot Data System of FIG. 2), respectively.

Figure 3A:
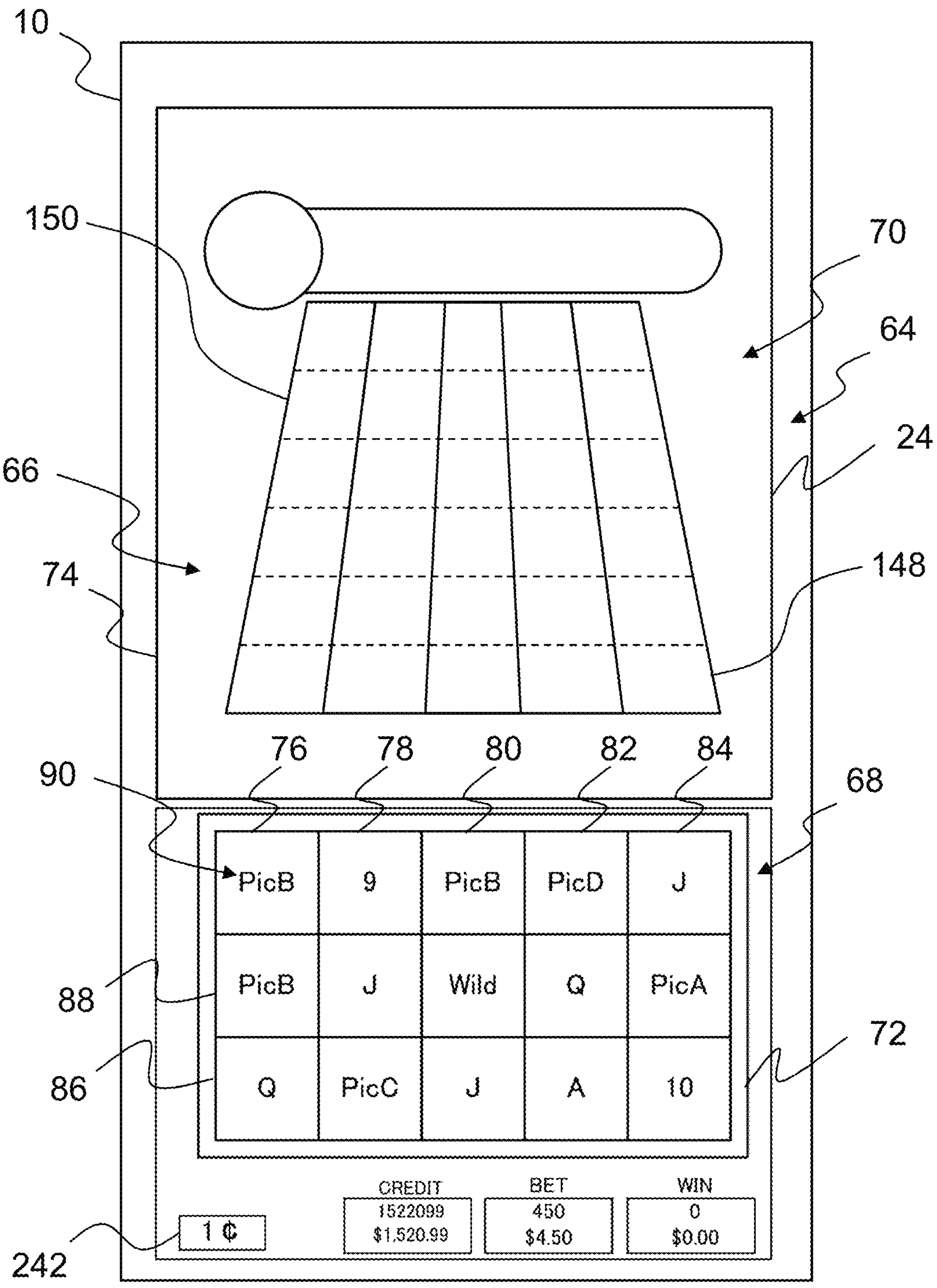
FIGS. 3A-3B are illustrations of a game displayed on a display area of the gaming machine in FIGS. 1A-2, according to an embodiment of the present invention.
Figure 3B:
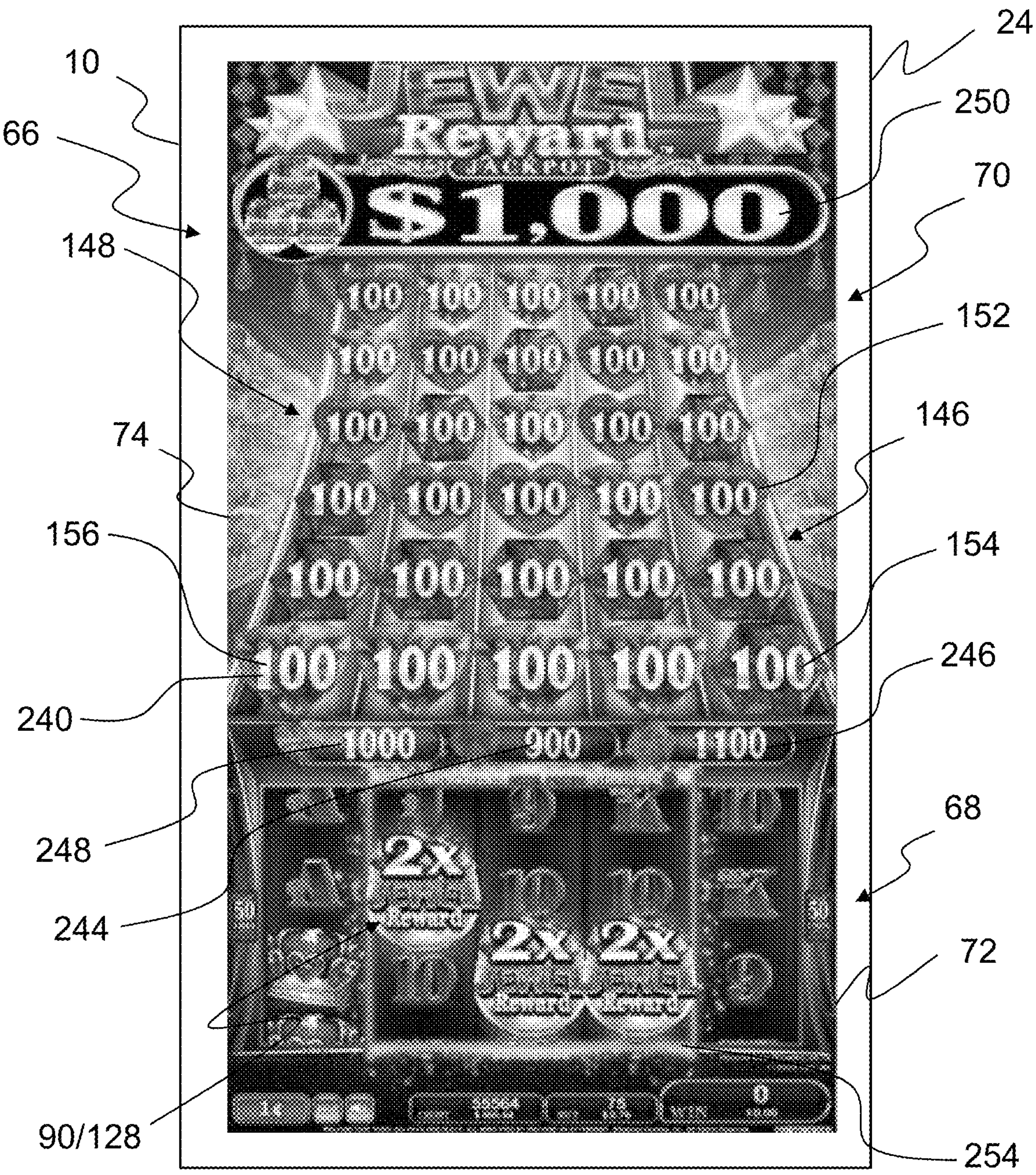
Figure 5:
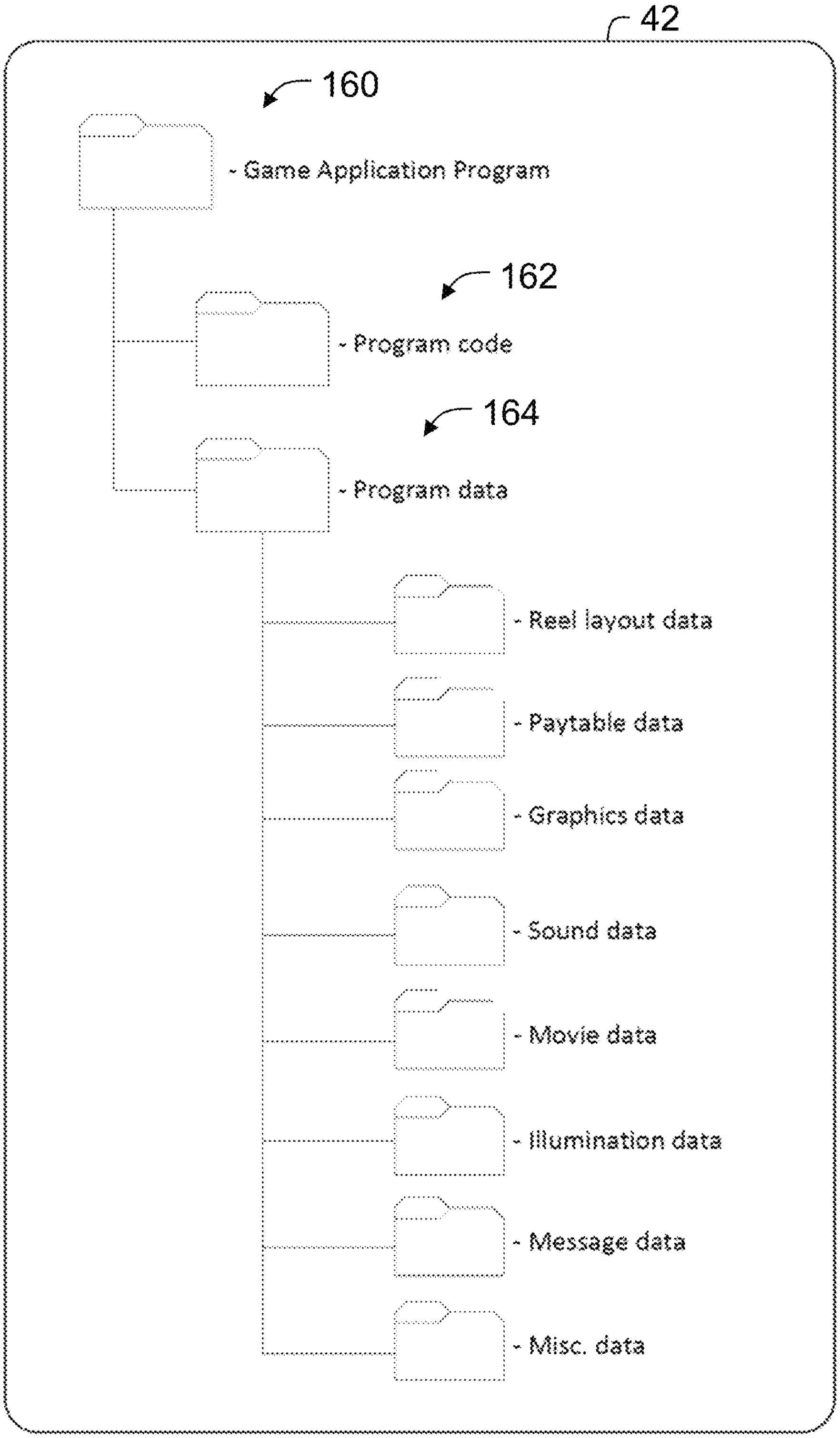
FIGS. 5-8 are block diagrams of a game control unit that may be used with to perform the function of executing a game on the gaming machine shown in FIG. 1A-2.
Figure 6:
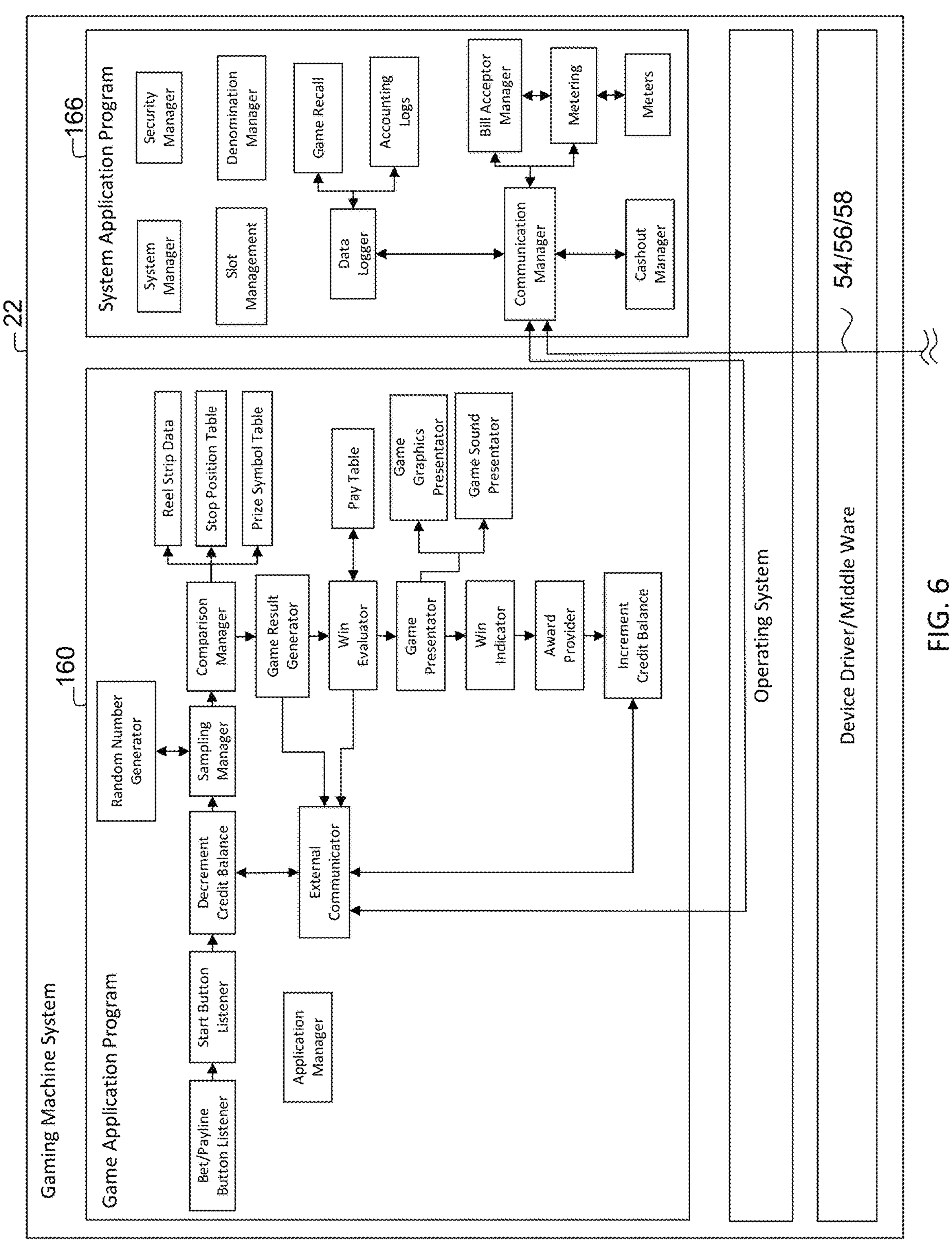
Figure 7:
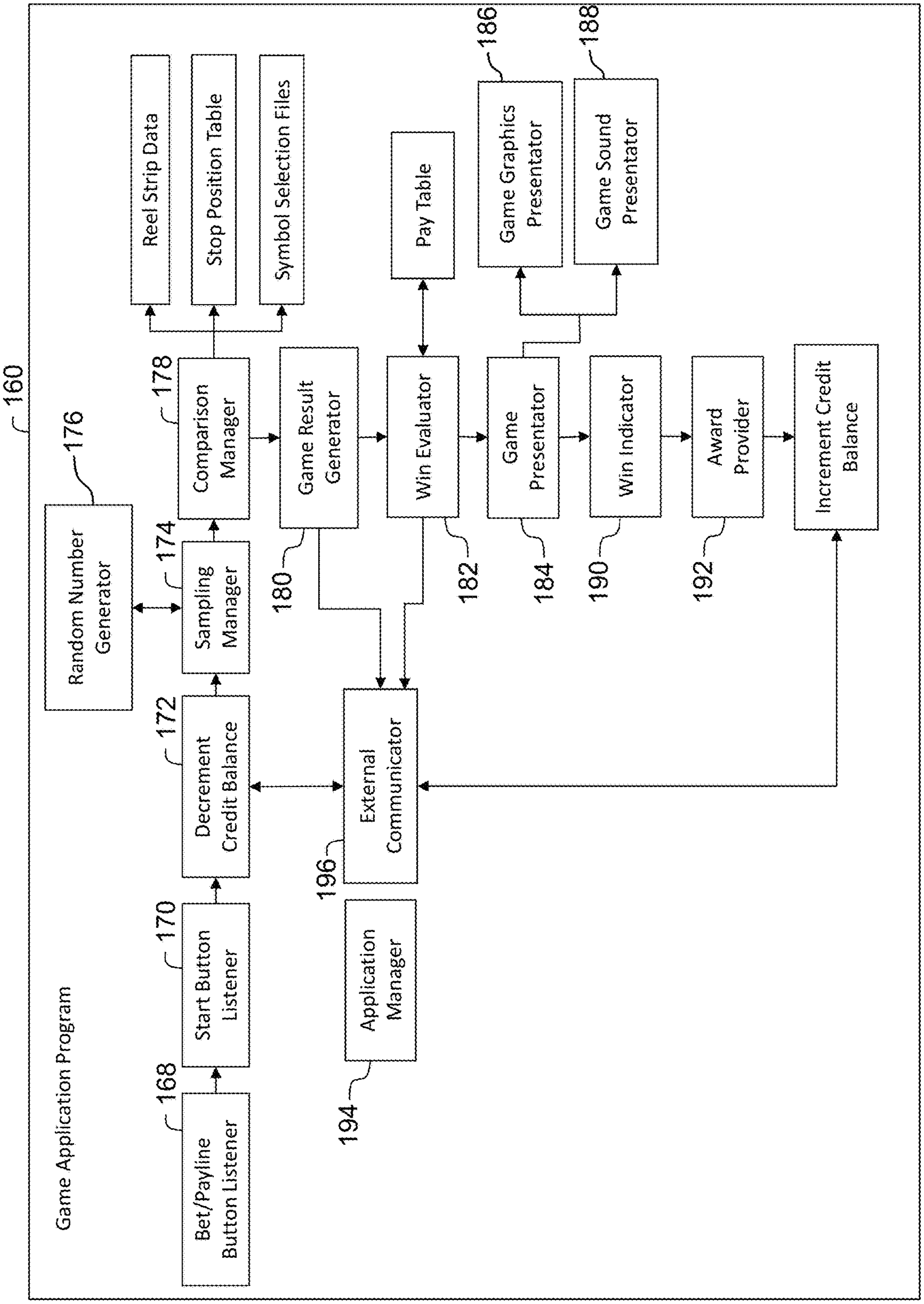
Figure 8:
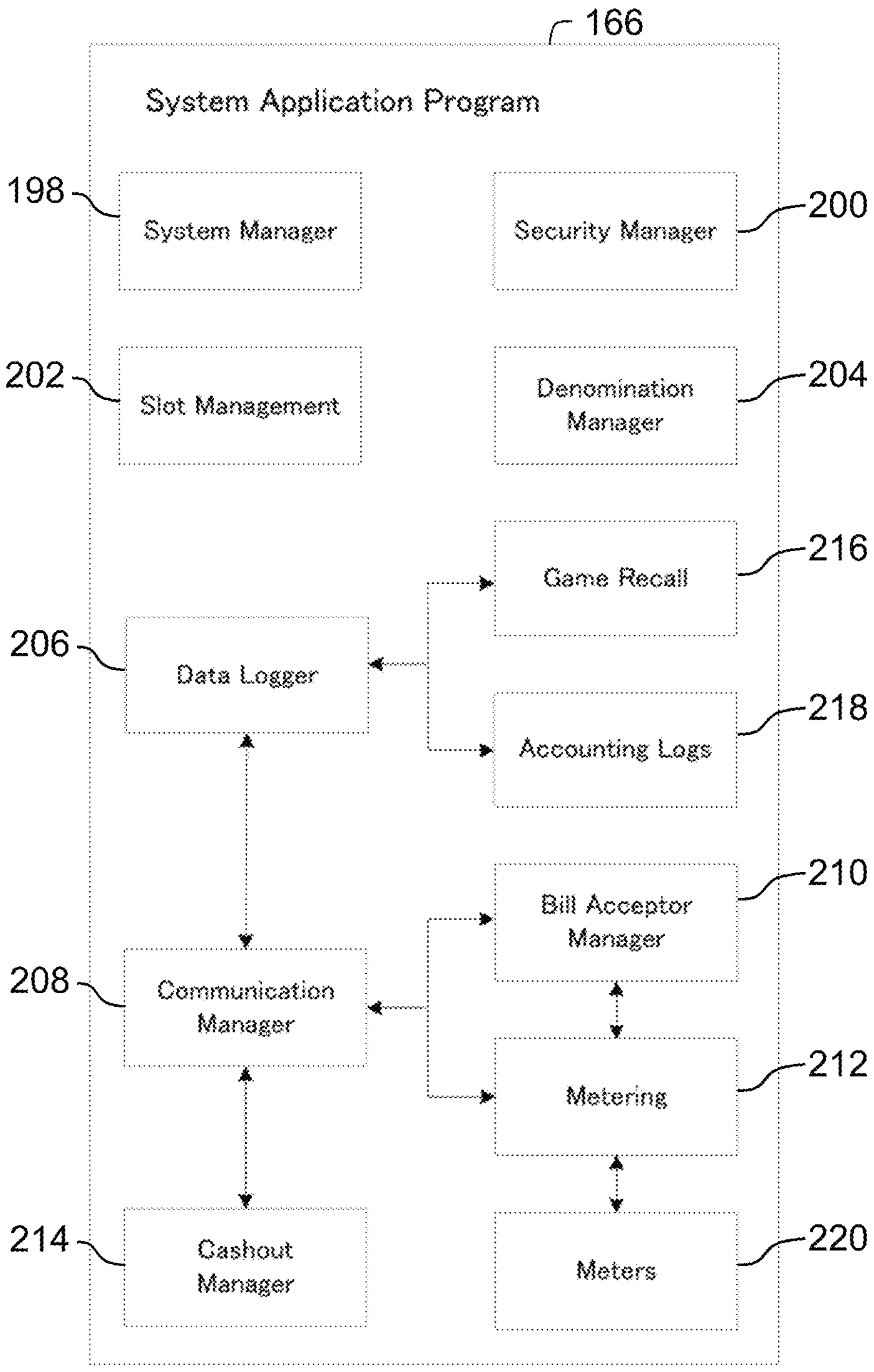

FIGS. 3A-3B schematically shows a display area 64 provided by the gaming machine Such a display area 64 is displayed on the display unit 24 (the upper display 14 and/or the lower display 16) by the control unit 22 executing a predetermined program. In one aspect of the present invention, the control unit 22 executes a game execution program to provide a game 66 that includes a primary game 68 and a bonus feature event 70. The control unit 22 displays a game screen within the display area 64 that includes the primary game 68 displayed within a primary game area 72, and the bonus feature event 70 displayed within a bonus feature event area 74. In the illustrated embodiment, primary game area 72 is displayed on the lower display 16 and the bonus feature event area 74 is displayed on the upper display 14. The upper display 14 may also be used to display animations and/or game identifying information during the game and/or during an attract mode. Further, the lower display 16 may display a decorative area, and an area that displays credit amount, bet number, and a credit amount obtained by winning (WIN number) and the like. In another embodiment, the primary game 68 and the bonus feature event 70 may be displayed in the same display.

In the illustrated embodiment, the primary game 68 includes a video slot game using a plurality of virtual reels 76, 78, 80, 82, 84. The video slot game utilizes a grid 86 in the display area 64. The illustrated embodiment shows the state of displaying the display area 64 in the lower display 16. By using such a display area, the gaming machine 10 of the present embodiment operates as a slot machine that pays a payout according to a winning combination of symbols displayed on the display area 64.

The display unit 24 displays a plurality of game symbols in the grid 86. The grid 86 has a plurality of rows (r) and columns (c). The grid 86 is configured by a plurality of cells 88 that are the stop position of symbols. On each of the plurality of cells 88 of the display area 64, one symbol is stopped and displayed.

On each cell 88 of the grid 86, as shown in FIGS. 3A and 3B, a game symbol 90 is displayed based on the symbol arrangement of virtual reels including virtual reels 76, 78, 80, 82, 84 (also shown in FIG. 4) configured as a virtual reel set 92. That is, the cells 88 of the grid 86 correspond to the virtual reels 76 to 84, by column, and the game symbols 90 disposed on predetermined parts of each virtual reels 76 to 84 are displayed. Furthermore, by moving (scrolling or spinning) each game symbol 90 by column based on the symbol arrangement of the virtual reels 76 to 84, the game symbols 90 displayed in the cells 88 of the grid 86 change, and by stopping the movement (scrolling or spinning) by columns, the game symbols 90 are stopped. Here, the virtual reels 76 to 84 are data where the control unit 22 uses a program having the memory 42 or the storage 44, and data showing the symbol arrangement (i.e., the order of symbols on each reel strip) regulated by each cell column. Further, the virtual reel set 92 is a general term for such virtual reels 76 to 84.

The control unit 22 generates each virtual reel 76 to 84, in the examples of FIGS. 3A, 3B, and 4, using reel strip data files 94 and 96 stored in memory 42 and/or storage 44 (shown in FIGS. 15 and 16). Each reel strip data file 94, 96 includes a reel designation 98 associated with each virtual reel 76 to 84 and sequential symbol position logic cells 100 associated with each reel designation 98. Each symbol position logic cell 100 includes indicators for rendering the virtual reels with a plurality of game symbols. For example, in one embodiment, the control unit 22 uses a primary game reel strip data file 94 for generating virtual reels 76 to 84 used during a primary game, and uses a free game reel strip data file 96 for generating the virtual reels 76 to 84 used during a free spin game. Each reel strip data file 94, 96 includes information for generating each virtual reel 76 to 84 including a plurality of reel strips 102, 104, 106, 108, 110 that correspond to each virtual reel 76 to 84. Each reel strip 102, 104, 106, 108, 110 includes a number of symbol positions 112 configured to be populated by game symbols 90 that are selected from game symbol image files 114, 116, and 118 stored in memory 42 and/or storage (shown in FIGS. 17-19). The symbol positions 112 and the corresponding game symbols 90 are arranged in an order defined by each reel strip 102, 104, 106, 108, 110. In addition, one or more reel strips 102, 104, 106, 108, 110 includes a different number of symbol positions 112. For example, in one embodiment, the primary game reel strip data file 94 includes reel strip 102 having a fewer number of symbol positions 112 than reel strip 104, the free game reel strip data file 96 includes reel strip 102 having a greater number of symbol positions 112 than reel strip 104.

In the illustrated embodiment, each reel strip 102, 104, 106, 108, 110, includes a plurality of fixed symbol positions 120 for displaying game symbols 90. Each fixed symbol position 120 includes indicators for displaying a predefined game symbol 90 selected from a set of game symbols 90 included in a fixed game symbol image data file 118. For example, for each play of the game, the fixed symbol positions 120 have an associated predefined game symbol 90 from a symbol set 122. The fixed game symbol image data file 118 includes the details of game symbols 90 populating the fixed symbol positions 120 and includes varieties of game symbols 90. This symbol set 122 includes card symbols ("9", "10", "J", "Q", "K", and "A") that imitate playing cards as regular symbols, and picture symbols ("PicA", "PicB", "PicC", and "PicD") that show a pattern. Further, this symbol set 122 includes a free game trigger symbol ("Scatter") that may be used to determine if a free game feature is to be provided. Each of these symbols have a different rank from each other regarding their value when winning, their rank gradually raises in this order: "9", "10", "J", "Q", "K", "A", "PicE", "PicD", "PicC", "PicB", "PicA". A combination of symbols that includes high-ranking symbols when winning, can obtain a larger winning payout compared to a combination of low-ranking symbols when winning.

In the illustrated embodiment, each reel strip data file 94 and 96, also includes a subset of reel strips 124 that include a plurality of modifiable symbol positions 126. Each modifiable symbol position 126 is configured to display a special symbol 128 that is randomly selected from a group of special symbols 128. For example, for each play of the game, the control unit 22 randomly selects one of the special symbols 128 included in a special symbol image data file 116 (shown in FIG. 18) and populates each modifiable symbol position 126 with the randomly selected special symbol 128. For example, the control unit 22 may access a wild symbol selection data file 129 (shown in FIG. 20) being stored in the memory device for use in randomly selecting special symbols 128 using a random number generator. The wild symbol selection data file 129 includes a plurality of wild symbol selection probabilities and/or random number ranges associated with each of the special symbols 128. In one embodiment, each wild symbol selection probability and/or random number ranges may be the same. In another embodiment, one or more wild symbol selection probabilities and/or random number ranges may be different.

In the illustrated embodiment, the subset of reel strips 124 includes reel strips 104, 106, and 108 that are associated with the 2nd virtual reel 78, the 3rd virtual reel 80, and the 4th virtual reel 84, respectively. As shown in FIGS. 15 and 16, in one embodiment, reel strips 102 and 110 which are used to generate the 1st virtual reel 76 and the 5th virtual reel 84 do not include modifiable symbol positions 126.

As shown in FIG. 18, in one embodiment, the group of special symbols 128 may include three wild symbols ("Wild 1", "Wild 2", and "Wild 3"). Each wild symbol includes an image of a gold pot filled with a plurality of jewels. Each jewel is different. For example, the "Wild 1" symbol 130 displays a gold pot with red, heart-shaped jewels, the "Wild 2" symbol 132 displays a gold pot with blue, emerald-shaped jewels, and the "Wild 3" symbol 134 displays a gold pot with green, trillion-shaped jewels. In addition, the subset of reel strips 124 may also include a plurality of fixed symbol positions 120 that includes a mixed-wild symbol position 136 for displaying an extra special symbol 138 ("Special Wild" shown in FIG. 18). The "Special Wild" symbol 138 displays a white pot filled with red, green, and blue jewels.

During the primary game 68, the special symbols 128 and the extra special symbol 138 may substitute as another symbol when a win combination is determined in the primary game 68, and serve as a trigger symbol that indicated a triggering event that initiates the bonus feature event 70 when the triggering event occurs during the primary game 68.

It should be noted that in one aspect of the present invention, one or more dynamic virtual reel strips may be utilized. Using virtual reel strips, the symbols and/or symbol positions and/or virtual reel strips and/or length or size and/or any aspect of a virtual reel strip may change from one spin or play to the next. For example, a dynamic reel strip includes a plurality of symbol positions with symbols from the symbol set 122 and a plurality of modifiable symbol positions. The modifiable symbol positions may be in the form of one or more stacks, i.e., adjacent symbol positions. In one embodiment, the location and/or size of the stacks may change from one spin to the next, either randomly and/or in a predetermined pattern.

Alternatively, a virtual reel strip associated with a cell 88 (or column of cells 88) may be dynamically changed from one spin or play to another spin or play. This, may occur randomly, every spin or play and/or in a predetermined pattern.

It should be noted that in the illustrated embodiment, each column of the grid 86 has a corresponding reel. When the reel stops, a symbol from the respective reel appears in each one of the cells of the respective column of the grid 86. One or more of the reels 76 to 84 may be identical or all of the reels 76 to 84 may be different.

In an alternative embodiment, however, each cell 88 of the grid 86 has a respective independent reel that may spin independently of the other reels. Each cell 88 of the grid 86 may, thus, have an independent reel with a corresponding virtual reel strip. The virtual reel set may include different number of virtual reel strips in such a case. For example, in an example in which a 3×5 grid is utilized, each cell 88 would have an associated virtual reel strip, so fifteen reel strips would be utilized. As above, one or more of the fifteen virtual reel strips may be identical or all reel strips may be different.

In the next several embodiments, the present invention will be described with respect to a 3×5 grid, however, it should be noted that the present invention is not limited to a grid with any specific size and/or shape.

In general, the control unit 22 starts a game and determines the stop position of each virtual reels 76 to 84 randomly using a reel stop position data file 140 (shown in FIG. 22) stored in the memory device. The virtual reels 76 to 84 that are displayed in the display unit 24 (for example, the lower display 16) are moved from a current position, and stopped based on a stop position to express an outcome of the game. Due to this, in the display or grid 86, the symbols included on the virtual reels 76 to 84 are continuously moved (scrolled or spun) in a vertical direction of the display area 64, and one symbol of one cell 88 is aligned in an order of the symbol based on the symbol arrangement is stopped so that it is displayed.

The control unit 22 changes and stops the plurality of symbols displayed on the display unit 24 according to the operation of the player received by the operation unit 32, and a payout may be paid according to the stopped symbols inside the display area 64 and a pay line set 142 and paytable data file 144 (show in FIGS. 23-24) stored in the memory device.

In the display area 64, a pay line is set that is used when winning is determined. The pay line is set to be extended over the column on the right end from the cells of the column of the left end, and is a line that combines the plurality of cells 88 determining a win. The number of effective lines within the set pay line is selected by the operation of a group of line designation buttons included in the group of setting buttons 34 of the operation unit 32 for the player. The control unit 22, in regards to the result of a game that is a combination of symbols, determines a win when a predetermined number of identical symbols is surpassed and aligned on a set pay line, and pays a payout to the player according to the type and number of symbols. On the gaming machine 10 of the present embodiment, a predetermined number of pay lines (LINE 1-50) of cells with three rows and five columns in the display area 64 is set (see FIGS. 3A-3B). The system for determining a win may determine a win when a predetermined number of identical symbols from cells of the column on the left end are aligned on a set pay line, may determine a win when a predetermined number of identical symbols from cells of the column on the right end are aligned on a set pay line, and may determine a win when a predetermined number of identical symbols are aligned on a continuous column on a predetermined pay line. In addition, more than a predetermined number of the special symbols 128, extra special symbols 138, or Scatter symbols form a win combination or trigger condition regardless of the pay line.

Figure 23:
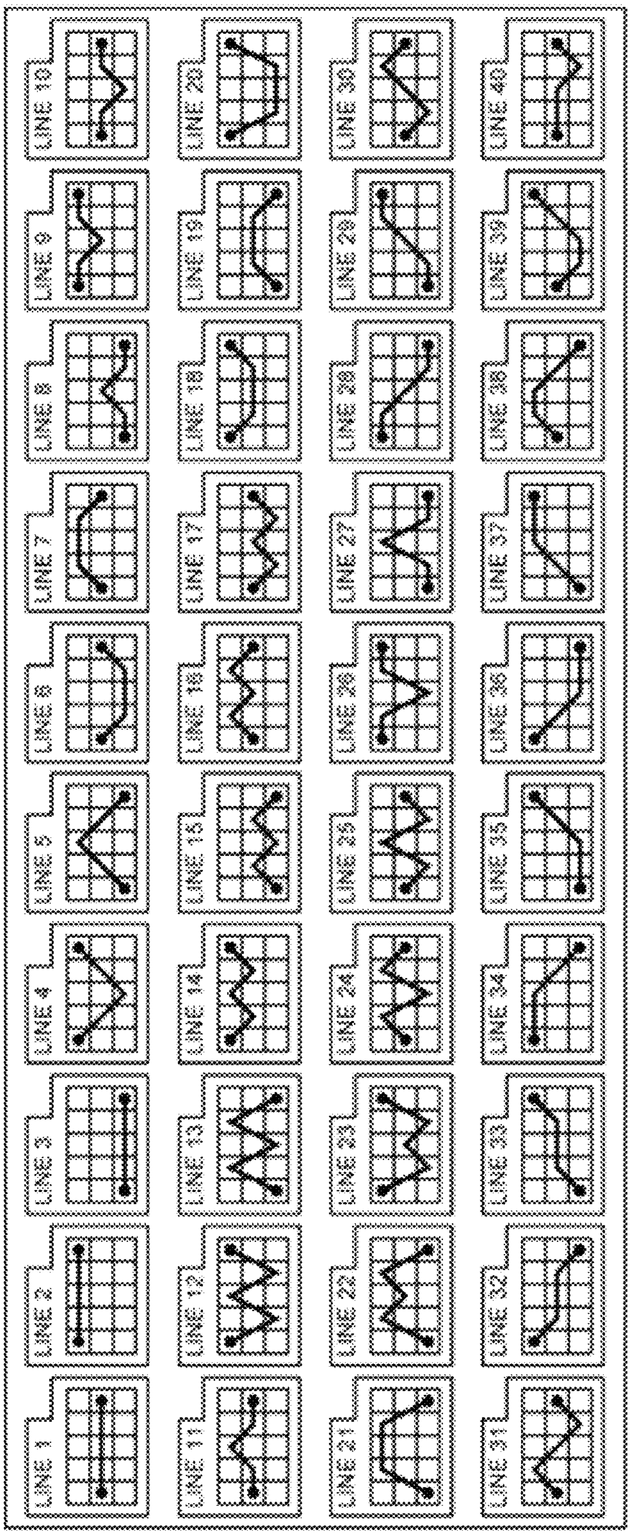
FIG. 23 is an illustration showing one example of a pay line set on the determination area of the game illustrated in FIGS. 3A-3B.

It should be noted that pay lines shown other than (or in addition to) the pay lines shown in FIG. 23 may be used. In general, the pay lines shown in FIG. 23 start in the first column and end in the last column, and include one cell per column. However, one or more pay lines could include one or more cells in the same column and may include a vertical pay line.

In the illustrated embodiment, the bonus feature event 70 includes a plurality of credit prize symbols 146 being displayed on a bonus feature event grid 148. The bonus feature event grid 148 includes a plurality of cells 150 arranged in a predefined number of columns. Each cell 150 displays a corresponding credit prize symbol 146. As shown in FIG. 3A, in one embodiment, the bonus feature event grid 148 includes 30 cells 150 arranged in 5 columns displaying 30 credit prize symbols 146, however, the number of displayed credit prize symbols 146, the number of columns, and the number of cells 150 per column may be varied.

The credit prize symbols 146 are selected from the group of credit prize symbols included in a credit prize symbol image data file 114 (shown in FIG. 17) that is stored in the memory device. Each credit prize symbol 146 is classified into one of a plurality of types of credit prize symbols that are each associated with a special symbol 128. In one embodiment, each type of credit prize symbol corresponds to one of the special symbols 128 included in the special symbol image data file 116, and includes image characteristics that are similar to the image characteristics of the corresponding special symbol. For example, as shown in FIG. 17, the credit prize symbol image data file 114 includes three credit prize symbols ("Credit Symbol 1", "Credit Symbol 2", and "Credit Symbol 3"). The "Credit Symbol 1" symbol 152 displays a red, heart-shaped jewel that corresponds with the "Wild 1" symbol 130 which displays gold pot with red heart-shaped jewels. The "Credit Symbol 2" symbol 154 displays a blue, emerald-shaped jewel that corresponds with the "Wild 2" symbol 132 which displays gold pot with blue, emerald-shaped jewels. The "Credit Symbol 3" symbol 156 displays a green, trillion-shaped jewel that corresponds with the "Wild 3" symbol 134 which displays gold pot with green, trillion-shaped jewels.

During the bonus feature event 70, the control unit 22 randomly selects credit prize symbols 146 to populate the bonus feature event grid 148. For example, in one embodiment, the control unit 22 may initiate a random selection for each cell 150 included in the bonus feature event grid 148. The control unit 22 may access a credit prize symbol selection data file 158 (shown in FIG. 21) being stored in the memory device for use in randomly selecting credit prize symbols 146 using a random number generator. The credit prize symbol selection data file 158 includes a plurality of credit prize symbol selection probabilities and/or random number ranges associated with each of the credit prize symbols 146. In one embodiment, each credit prize symbol selection probability and/or random number ranges may be the same. In another embodiment, one or more credit prize symbol selection probabilities and/or random number ranges may be different. During the bonus feature event 70, the control unit 22 may also remove one or more of the credit prize symbols 146 being displayed in the bonus feature event grid 148, and replace the removed credit prize symbols 146 with randomly selected credit prize symbols 146. In one embodiment, the control unit 22 may perform a separate random selection for each replacement credit prize symbol 146.

Referring to FIGS. 5-8, in the illustrated embodiment, the memory 42 stores a game application program 160 that includes computer executable instructions that, when executed by the processor 38, cause the processor 38 to generate and display the game on the display unit 24 of the gaming machine 10. In one embodiment, the game application program 160 includes program code 162 and program object data 164 that includes computer executable instructions for implementing a game using the algorithms shown in FIGS. 11-14.

In the illustrated embodiment, the memory 42 stores the game application program 160 and a system application program 166 that includes computer executable instructions that, when executed by the processor 38, cause the processor

38 to generate and display the game on the display unit 24 of the gaming machine 10. The game application program 160 provides game specific/front-end functions and the system application program 166 program provides generic/back-end functions, when executed by the processor 38. In the illustrated embodiment, the game application program 160 and the system application program 166 are implemented on the same operating system. However, it should be noted that these programs may be implemented on different operating system and/or by different processors. In one embodiment, the game application program 160 includes a plurality of software modules including a bet/payline button listener module 168, a start button listener module 170, a credit balance manager module 172, a sampling manager 174, a random number generator 176, a comparison manager 178, a game result generator 180, a win evaluator 182, a game presentator 184, a game graphics presentator 186, a game sound presentator 188, a win indicator 190, an award provider 192, an application manager 194, and an external communicator 196. The game application program 160 may also include the reel strip data files, the symbol image data files, the symbol selection data files, the reel stop position data file, the pay line set, and the paytable data file.

The bet/payline button listener module 168 is a software module for receiving a signal from the bet button or the payline button which is generated by the button when a player operates the button to select number of bet or number of paylines. In response to receiving the signal, the bet/payline button listener module 168 communicates the occurrence of the signal to application manager 194 for changing bet or payline configuration of the game.

The start button listener module 170 is a software module for receiving a signal from the start button which is generated by the button when a player operates the button to start a game. In response to receiving the signal, the start button listener module 170 communicates the occurrence of the signal to application manager 194 for starting the game.

In response to receiving the signal from start button listener module 170, the application manager 194 requests the sampling manager 174 to obtain necessary number of random numbers from the random number generator 176.

The random number generator 176 generates random numbers based on predetermined algorithm of computational random generation method. The random number generator 176 may be a pseudorandom generator. In response to a request from sampling manager 174, the random number generator 176 returns random number. In some implementations, the random number generator 176 may be implemented in a central server. The random number generator 176 may be implemented as an integrated circuit or hard wired logic.

The comparison manager 178 compares the current state of the game or each random number with the reel strip data files, the symbol selection data files, the reel stop position data file, the pay line set, and/or the paytable data file and specifies corresponding reel layout, stop position, prize symbol, or trigger symbol based on each random number.

The game result generator 180 generates game result based on selected reel layout, stop positions of each reel, and bonus features.

The win evaluator 182 evaluates the game result with reference to the pay table.

The game presentator 184 provides game presentation process with visual and sound so as to form the predetermined game result finally.

The game graphics presentator 186 provides visual game presentation process on the display so as to form the predetermined game result finally.

The game sound presentator 188 provides sound presentation process by using sound controller and speakers.

The win indicator 190 indicates win combinations and payment condition of prize symbol formed in the game result.

The award provider 192 provides award credit to win meter based on the win evaluation.

The application manager 194 administrates activity and status of each software module. In addition, the application manager 194 administrates configuration, progress and states of the game application program 160.

The external communicator 196 communicates instruction and data with the system application program 166.

The credit balance manager module 172 executes a process for decrementing credit balance and incrementing credit balance based on win amount displayed in win meter.

In the illustrated embodiment, the system application program 166 provides back ground processing and functions other than game specific functions. The system application program 166 includes a plurality of software modules including a system manager 198, a security manager 200, a slot management module 202, a denomination manager 204, a data logger 206, a communications manager 208, a bill acceptor manager 210, a metering module 212, and a cashout manager 214.

The system application program 166 may also include a game recall file 216, accounting logs 218, and meters 220.

The system manager 198 is a software module for administrating all of the back ground processing and functions other than game specific functions conducted by the system application program 166.

The security manager 200 is a software module for administrating game verification, door security and monitoring security sensors.

The slot management module 202 is a software module for administrating data accumulation and communicating with external slot information system 62.

The denomination manager 204 is a software module for establishing denomination setting of the gaming machine 10. The denomination setting may include 1 cent, 2 cent, 5 cent, 25 cent, 1 dollar, 5 dollar and the like.

The data logger 206 is a software module for logging result of each primary game and the free game bonus to the game recall. In addition, the data logger 206 stores error events, bill log, cashout log, ticket log etc. to the accounting log.

The game recall file 216 is an accumulated data including results of each primary game and free game bonus. The game recall file 216 is stored in a non-volatile memory.

The accounting logs 218 is an accumulated data including error events, bill log, cashout log, ticket log etc. The accounting logs 218 are stored in a non-volatile memory.

The communications manager 208 is a software module for administrating communication between game application program 160 and system application program 166. The communications manager 208 also administrates network communication between system application program 166 and external network such as slot management system network, G2S network, gaming server for server based gaming network or VLT system network.

The bill acceptor manager 210 is a software module for administrating the bill acceptor and receives bill information inserted in the bill acceptor. In response to receiving the information from the bill acceptor, the bill acceptor manager 210 communicates with the metering for incrementing credit balance based on the inserted bill.

The metering module 212 is a software module for adjusting values of the meters 220 in response to communication with the game application program 160 via communications manager 208, the bill acceptor manager 210 or the cashout manager 214. The meters 220 includes a credit meter for indicating current credit balance on the gaming machine and a win meter for indicating win amount of current game session. The meters further include back ground meters such as coin-in, coin-out, total drop, attendant paid jackpots and/or bill-in. These meters might be implemented as data on the non-volatile memory or hardware meters.

The cashout manager 214 is a software module for administrating cashout procedure. In response to a player's operation on the cashout button, the cashout manager 214 is activated and the gaming machine pay total amount of the credit meter.

Figure 9:
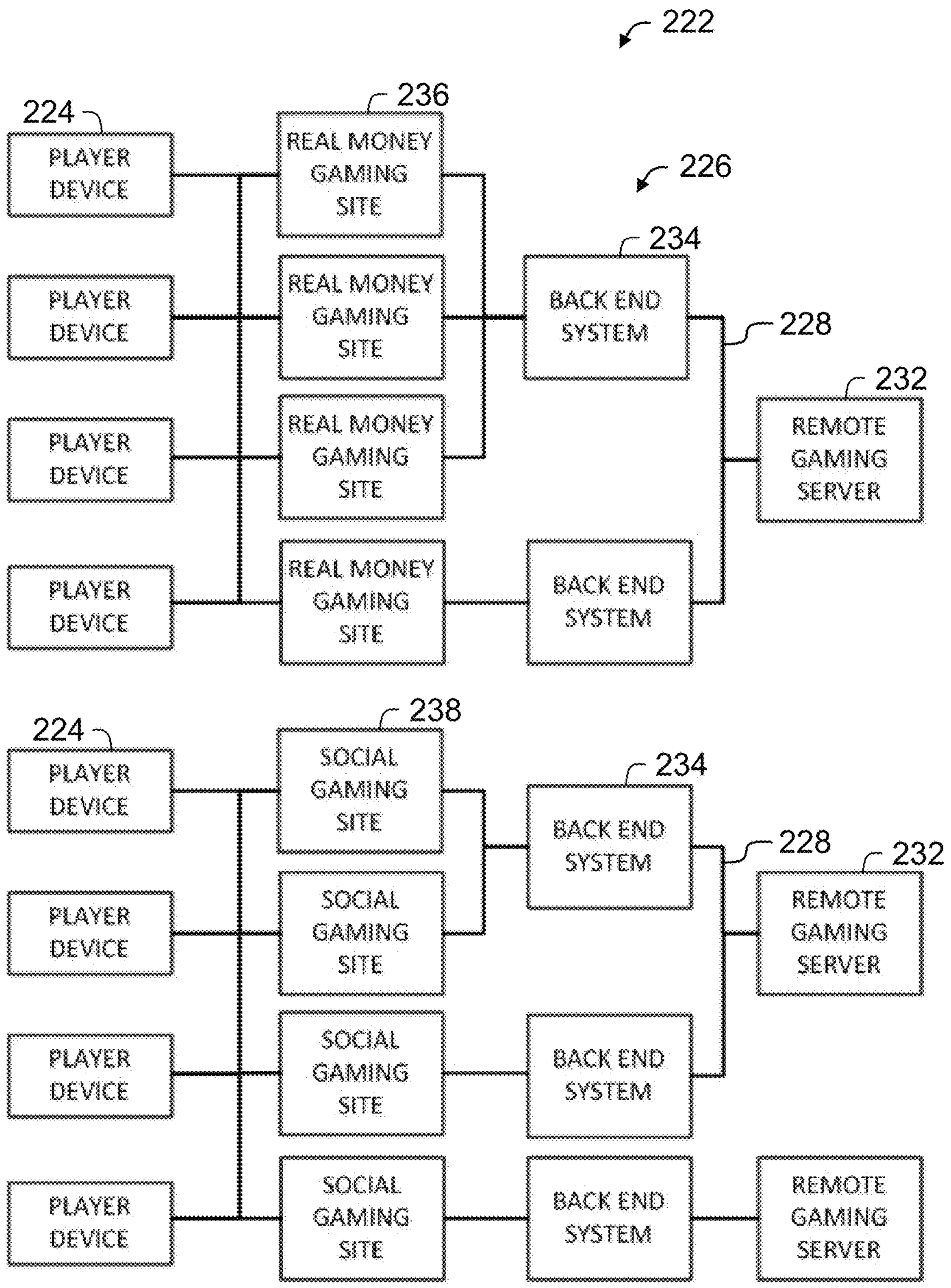
FIG. 9 is a functional block diagram of a server computer system, according to an embodiment of the present invention.
Figure 10:
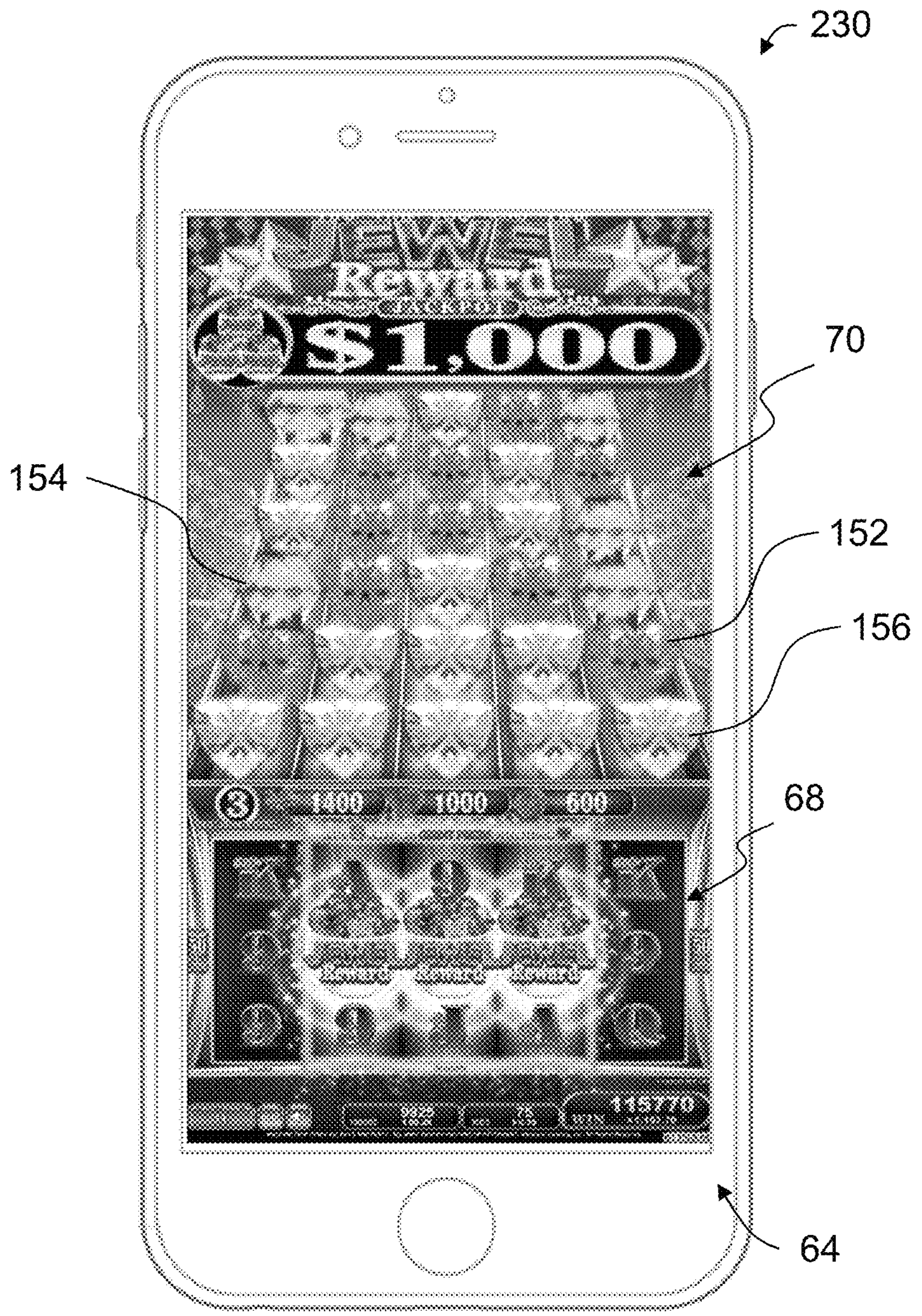
FIG. 10 is a front view of a mobile computing device that may be used with the server computer system of FIG. 9.

Referring to FIGS. 9 and 10, in one embodiment, the present invention includes a networked server computer system 222 that is configured to deliver the game to one or more client computing devices 224 over the Internet. In the illustrated embodiment, the networked computer system 222 includes an iGaming server system 226 that is coupled in communication with one or more client computing devices 224 via a communications network 228. The communications network 228 may be any suitable connection, including the Internet, an Intranet, LAN, a virtual private network (VPN), cellular networks, etc. . . . , and may utilize any suitable or combination of technologies including, but not limited to wired and wireless connections, always on connections, connections made periodically, and connections made as needed.

The client computing device 224 may include any suitable device that enables a user to access and communicate with the server system 226 including sending and/or receiving information to and from the server system 226 and displaying information received from the server system 226 to a user. In the illustrated embodiment, the client computing device 224 includes a processor coupled to a memory device. The memory device stores various programs and data that are executed by the processor for operating the client computing device 224. The client computing device 224 also includes an input device configured to receive operational inputs from the user, and a display device configured to display a graphical user interface. The input device and display device enable a user to interact with the server system 226 via the client computing device 224. For example, in one embodiment, the client computing device 224 may include, but is not limited to, a desktop computer, a laptop or notebook computer, a tablet computer, smartphone/tablet computer hybrid, a personal data assistant, a handheld mobile device including a cellular telephone, and the like. In one embodiment, the processor of the client computing device 224 may be programmed to function as the control unit 22 of the gaming machine 10.

In the illustrated embodiment, the client computing device may include a web browser program stored in the memory device. The processor executes the web browser program to display web pages on the display device that includes information received from the server system 226 to enable a user to interact with and operate the server system 226.

In one embodiment, the client computing device 224 includes a mobile computing device 230 (shown in FIG. 10) such as, for example, a tablet computer, a smartphone/tablet computer hybrid, a smartphone such as an iPhone™, and the like. The mobile computing device 230 includes a processor coupled to a memory device for storing various programs and data for use in operating the mobile computing device 230. The mobile computing device 230 may also include a touchscreen display unit 24, one or more video image cameras, one or more speakers, a microphone, at least one input button, and one or more sensors including, but not limited to, a touch ID fingerprint sensor coupled to an input button, a barometer, a three-axis gyro, an accelerometer, proximity sensor, and an ambient light sensor. In addition, the mobile computing device 230 may also include a Wi-Fi antenna, a cellular network antenna, a Bluetooth™ communications device, assisted GPS and GLONASS, a digital compass, and an iBeacon™ microlocation device.

The mobile computing device 230 may be programmed to store and execute mobile computer program applications that display graphical user interfaces on the touchscreen display unit 24 including display area 64 that allows the user to access the server system 226 to retrieve and store information within the server system 226 as well as interact with and operate the server system 226. In addition, in one embodiment, the server system 226 may install one or more mobile computer application programs in the memory device of the mobile computing device 230. When initiated by the processor of the mobile computing device 230, the mobile computer application program causes the processor of the mobile computing device 230 to perform some or all of the functions of the gaming machine 10.

In the illustrated embodiment, the server system 226 includes one or more remote gaming servers 232, one or more back-end servers 234, one or more real money gaming website hosting servers 236, and one or more social gaming website hosting servers 238. In the illustrated embodiment, the social gaming website hosting server 238 and the real money gaming website hosting server 236 are programmed to host a website that is accessible by a user via one or more client computing devices 224. The website hosting servers 236 and 238 execute a website application program that retrieves application code from the back-end server 234 and executes the application code to render one or more webpages on a display device of a client computing device 224 in response to requests received from the user via the client computing device 224 to allow users to interact with the website. The website hosting servers 236 and 238 are configured to generate and display webpages displaying a game. For example, the real money gaming website hosting server 236 is configured to host a real money wagering website that enables players to convert monetary funds to gaming credits that may be used to place wagers on the game. The social gaming website hosting server 238 is configure to host a social media and/or social gaming website that allows players to receive gaming credits for activities such as purchasing goods and/or services through an e-commerce website, and/or purchase gaming credits that may be used to play the game.

Each back-end server 234 is configured to perform operations to support the functions of the webpages and/or website being displayed by the website hosting servers 236 and 238. For example, in one embodiment, the back-end servers 234 may include a player account system server that is configured to generate player accounts that include data associated with a player including, but not limited to, player identification information, player financial account information, player gaming credit account information, and/or any suitable player information, that may be used to establish credit meters and allow players to place wagers on the game.

Each remote gaming server 232 includes one or more copies of the game application program 160 stored in a memory device of the remote gaming server 232. A processor of the remote gaming server 232 is programmed to retrieve and transmit the game application program 160 to one or more back-end servers 234 for use in displaying the game to the user via a webpage being displayed by the web browser program.

In one embodiment, the game application program 160 may include instructions for rendering the game and executing the game on the client computing device 224. For example, the game application program 160 may include instructions for generating rendered code, such as, for example HTML code, which may be used by the web browser program of the client computing device 224 for displaying the game. For example, the game application program 160 may include program software code including, but not limited to, HTML, JavaScript, cascade style sheets (CSS), and any suitable programming code that may be used for rendering and operating the game via a website and/or mobile computer application.

In one embodiment, upon receiving a request from the website hosting servers 236, 238 via the back-end server 234, the remote gaming server 232 may execute the game application program 160 to operate the game, and execute a render-to-string operation to generate rendered code indicative of the game, such as, for example HTML code, and transmit the rendered code to the back-end server 234. The back-end server 234 may then transmit the rendered code to the corresponding website hosting servers 236, 238 for use in displaying the game on the website. As the player plays the game, the remote gaming server 232 may execute the game application program 160 for each instance of the game, and transit rendered code to the back-end servers 234.

In another embodiment, the remote gaming server 232 may transmit the game application program 160 to the back-end server 234 and/or the website hosting servers 236, 238. The back-end server 234 and/or the website hosting servers 236, 238 may then execute the game application program 160 to initiate the instances of the game and execute render-to-string operations to generate rendered code indicative of the game.

In yet another embodiment, the back-end server 234 may receive a request to initiate the game from a mobile computing device 230 executing the mobile computer application program. Upon receiving the request, the back-end server 234 may access the game application program 160 and execute a render-to-string operation to generate rendered code indicative of the game and transmit the rendered code to the mobile computing device 230. In one embodiment, the back-end server 234 may continuously execute the game application program 160 to generated each instance of the game using a random number generator of the back-end server 234 based on input received from the mobile computing device 230 and generate and transmit rendered code for each instance of the game to the mobile computing device 230. In another embodiment, the back-end server 234 may execute a partial-render operation and generate partially-rendered code of the game using the game application program 160, and transmit the partially rendered code of the game and object data of game assets to the mobile computing device 230. The partially rendered code includes instructions for generating rendered code using the game assets and a random number generator of the mobile computing device for generating and displaying the game on the mobile computing device 230 using the mobile computer application program.

In one embodiment, the game application program 160 may be stored on several different servers. The game code on these servers is used to distribute game content to social or real money gaming websites and mobile applications. The distribution method is very flexible. For example, the game code and/or game application program 160 including game code and game object assets may be stored on a remote gaming server 232. One remote gaming server 232 may be connected to one or more back-end server 234.

Each back-end server 234 is configured to distribute the games to one or more websites or mobile applications. Players connect to these websites/mobile applications with the client devices or mobile devices and have access to the game content. A copy of game application program 160 including game code and game object assets is stored on the remote gaming server 232 for each back-end server 234 that is connected to the remote gaming server 232 and that distributes the game. For example, if one remote gaming server 232 is connected to two back-end servers 234, which is connected to three website hosting servers 236, 238 that distribute the game, the remote gaming server 232 would store two copies of the game application program 160 including game code and game object assets for the game (e.g., one copy for each back-end server 234).

For example, the server system 226 may be configured to implement the game on a mobile application such as, for example, "my KONAMI Slots™" mobile application available in Apple iOS™, Google Android™, and Amazon Kindle™ operating platforms, or on social-media websites such as the "my KONAMI Slots™" available on Facebook™. In one embodiment, the mobile application may download the game code from remote gaming server 232 via the real money gaming site 236 or the social gaming site 238 and execute the game code on the client computing device 224. In this embodiment, the game code may provide game specific/front-end function when executed by the processor of the client computing device, and the back end system 234 may provide generic/back-end function.

FIGS. 11-14 are flow charts of methods 300, 400, 500, and 600 illustrating the algorithms included in the game application program 160 and performed by the processor 38 when executing the game application program 160 for operating the gaming machine 10 and/or iGaming server system 226 to implement the game. The methods include a plurality of steps. Each method step may be performed independently of, or in combination with, other method steps. Portions of the methods may be performed by any one of, or any combination of, the components of the gaming machine 10 and/or iGaming server system 226. FIGS. 25A-29D are diagrammatic illustrations of the game being displayed on the display area of the gaming machine in FIGS. 1A-1B and the mobile computer device shown in FIG. 10, according to an embodiment of the present invention. FIGS. 15-24 are exemplary illustrations of computer program data files that may be used by processor 38 when executing the game application program 160.

In the illustrated embodiment, the game execution program 160 includes computer instructions for generating the primary game 68 that includes a plurality of virtual reels 76-84, and the bonus feature event 70 that includes a plurality of credit prize symbols 146. In general, the bonus feature event 70 is executed when a triggering event is detected during the primary game 68. The bonus feature event 70 provides a credit award to the player based on the type of trigger symbols being displayed with an outcome of the primary game 68. In one embodiment, the primary game 68 includes a reel-type game that includes a plurality of virtual reels that spin and stop to display the outcomes of the primary game. In other embodiments, the primary game 68 may include a playing card game, a bingo game, a Keno game, and/or any suitable casino type wagering game.

In the illustrated embodiment, the control unit 22 is programmed to execute the algorithm illustrated in methods 300, 400, 500, and 600 for executing the game 66 and displaying the game 66 on the display unit 24. In method step 302, the processor 38 displays the game screen on the display unit 24 including the primary game area 72 and the bonus feature event area 74.

The primary game area 72 displays virtual reels 76-84. The bonus feature event area 74 includes a plurality of credit prize symbols 146. Each credit prize symbol 146 is associated with a corresponding special symbol 128 and has an associated credit prize value 240 (shown in FIG. 3B). The processor 38 accesses the credit prize symbol selection data file 158 (shown in FIG. 21) and uses random numbers to randomly select the credit prize symbols 146, and displays the randomly selected credit prize symbols 146 in the bonus feature event grid 148. In the illustrated embodiment, the processor 38 assigns the same credit value to each credit prize symbol 146. In another embodiment, the processor 38 may assign a different credit value to one or more credit prize symbols 146. The processor 38 may also be programmed to determine the credit prize value 240 as a function of a bet denomination value 242 (shown in FIG. 3A) of the game 66. For example, the processor 38 may be programmed to assign a credit prize value to equal to 100× the bet denomination value 242 or bet per line value of the game 66. The processor 38 may also allow the player to select the bet denomination value 242 for the game 66. For example, the processor 38 may allow the player to establish the denomination setting of the game by selecting from a predefined group of bet denomination values including 1 cent, 2 cent, 5 cent, 25 cent, 1 dollar, 5 dollar and the like. Upon detecting a selection of a bet denomination value by the player, the processor 38 may then calculate a credit prize value equal to 100× the selected bet denomination value 242 and assign the calculated credit prize value to each credit prize symbol 146. For example, FIG. 3B illustrates a game having a bet denomination value 242 equal to 1 cent, with each credit prize symbol 146 being assigned a credit prize value 240 equal to 100 credits (e.g., where 1 cent=1 credit, credit prize value=100×1 credit=100 credits).

In the illustrated embodiment, the processor 38 is programmed to determine a number of displayed credit prize symbols 146 that is associated with each special symbol 128 and determine a credit prize amount that is associated with each of the special symbols 128 based on a total credit value of each corresponding number of displayed credit prize symbols 146 that are associated with a corresponding special symbol 128. For example, FIG. 3B illustrates 30 randomly selected credit prize symbols 146 being displayed in the bonus feature event area 74. The 30 randomly selected credit prize symbols 146 includes a first group including 9 "Credit Symbol 1" symbols 152 associated with the "Wild 1" symbol 130, a second group of 11 "Credit Symbol 2" symbols 154 associated with the "Wild 2" symbol 132, and 10 "Credit Symbol 3" symbols 156 associated with the "Wild 3" symbol 134. The processor 38 calculates a first credit prize amount 244 associated the "Wild 1" symbol to include 900 credits (i.e., 9 "Credit Symbol 1" symbols 152 100 credits=900 credits), a second credit prize amount 246 associated the "Wild 2" symbol to include 1100 credits (i.e., 11 "Credit Symbol 2" symbols 154 100 credits=1100 credits), and a third credit prize amount 248 associated the "Wild 3" symbol to include 1000 credits (i.e., 10 "Credit Symbol 3" symbols 156 100 credits=1000 credits). The processor 38 then displays each determined credit prize amount 244, 246, 248 on the game screen prior to spinning the virtual reels 76-84.

The processor 38 also generates and displays a jackpot credit value 250 that is associated with the extra special symbol 138 in the bonus feature event area 74. In one embodiment, the processor 38 may be programmed to calculate the jackpot credit value 250 to equal 100000× the bet denomination value 242 or bet per line value of the game 66. For example, FIG. 3B illustrates the game 66 having a bet denomination value 242 equal to 1 cent. The processor 38 calculates the jackpot credit value 250 equal to $1,000 (e.g., where 1 cent=1 credit, jackpot credit value=100000×1 credit=100,000 credits, or $1,000). In the illustrated embodiment, the jackpot credit value 250 is displayed as a currency value (e.g., "$1,000"). In another embodiment, the jackpot credit value 250 may be displayed as a credit value (e.g., "100,000" credits). In addition, upon detecting a selection of a bet denomination value by the player, the processor 38 may then calculate the jackpot credit value 250 based on the selected bet denomination value 242.

In method step 302, the processor 38 receives a signal to initiate an instance of the game 66 and generates the virtual reels 76-84 for use during the instance of the game 66. For example, the processor 38 may receive a signal from the display unit 24 and/or the operation unit 32 indicating a player's request to initiate an instance or play of the game 66. In one embodiment, the player may transmit a request to initiate an instance or play of game 66 by depressing a corresponding "spin" button on the operation unit 32 by touching a corresponding button icon being displayed on a touchscreen of the display unit 24. Upon receiving a signal from the display unit 24 and/or the operation unit 32, the processor 38 initiates the instance of the game 66 by generating the virtual reels 76-84 for use in the primary game 68.

Figure 12:
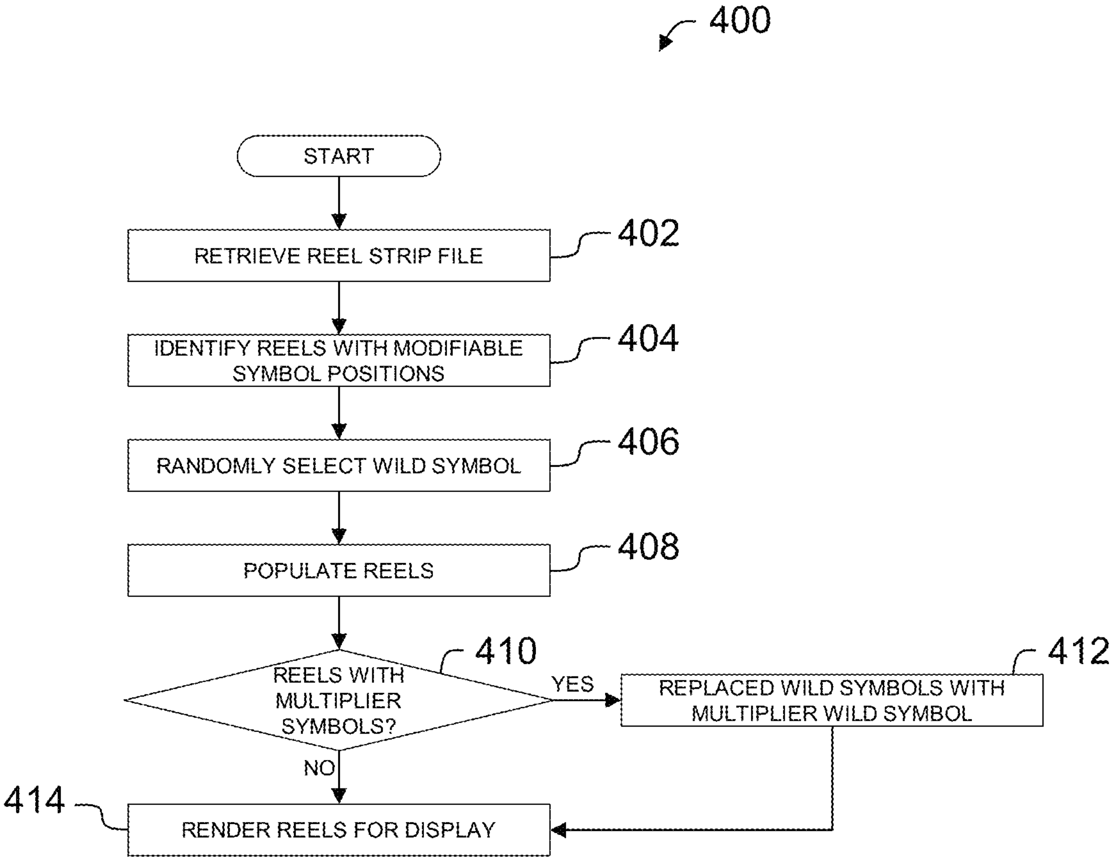
Figure 13:
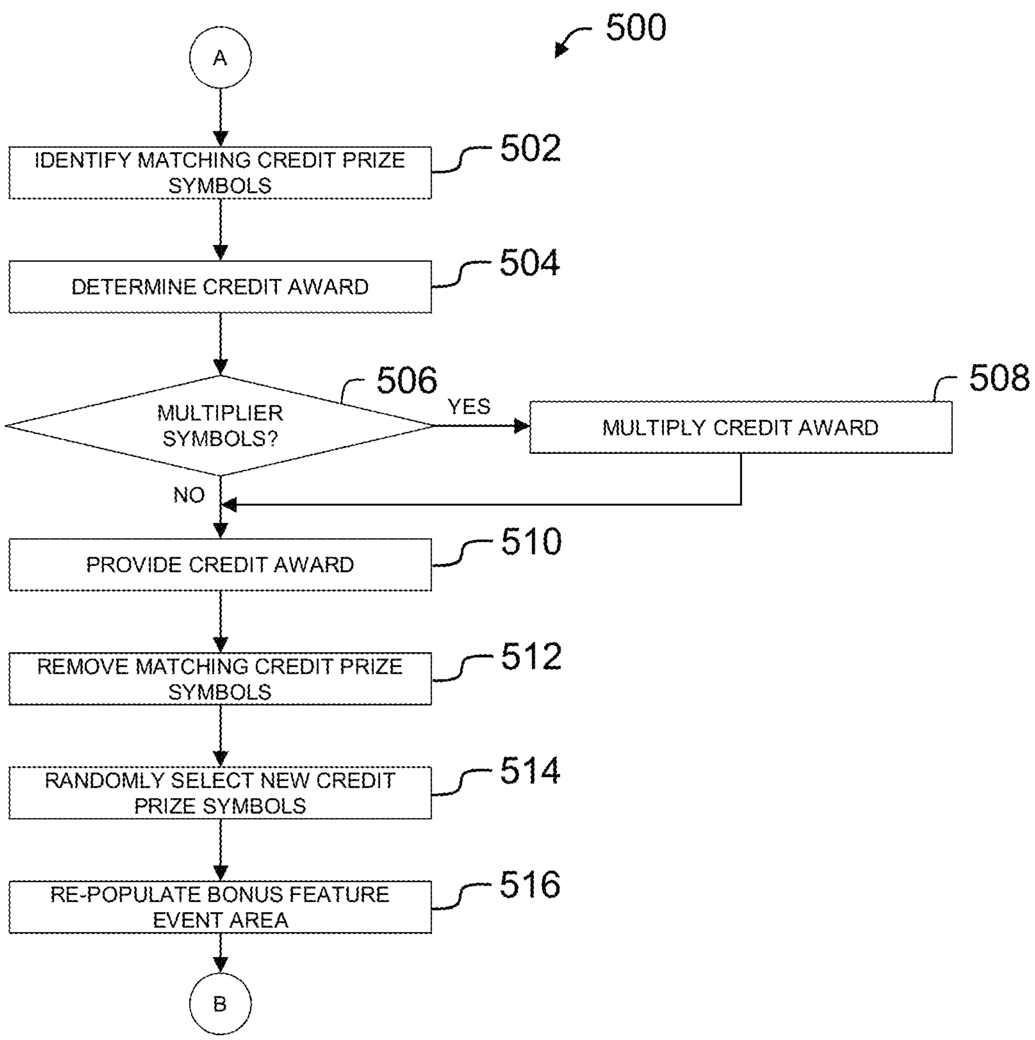
Figure 14:
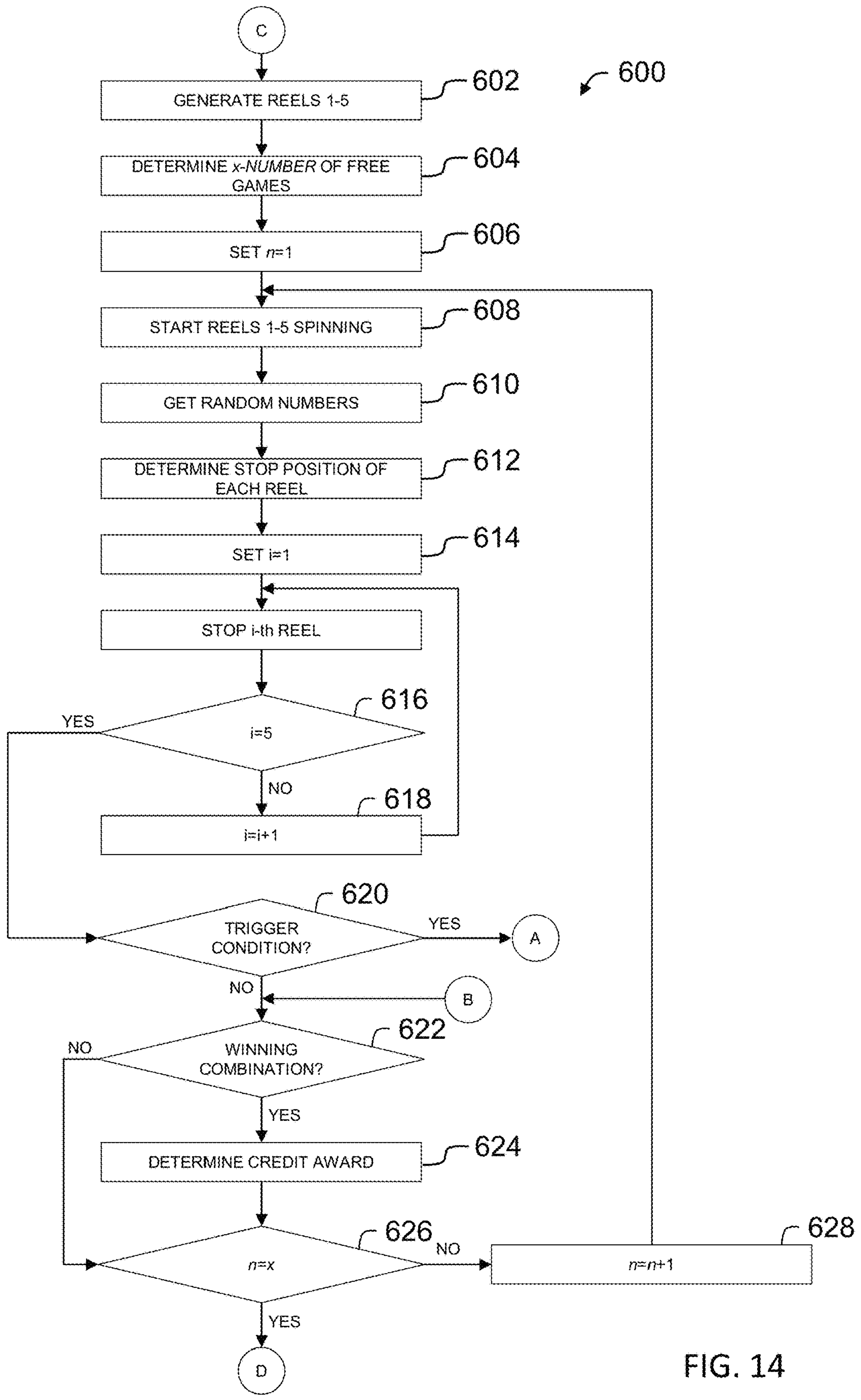

In the illustrated embodiment, the processor 38 is programmed to generate the plurality of virtual reels 76-84 by executing the algorithm illustrated in method 400 (shown in FIG. 12). In method step 402, the processor 38 accesses the primary game reel strip data file 94 (shown in FIG. 15) to identify a reel designation 98 and symbol position 112 associated with the virtual reel being generated, and access each sequential symbol position logic cell 100 for generating and displaying the corresponding game symbols. The processor 38 then generates the corresponding virtual reel strip based on the instructions associated with each sequential symbol position logic cell 100, associated with the reel designation 98. In the illustrated embodiment, the processor 38 generates each of the virtual reels 76-84 to include a plurality of fixed symbol positions for displaying game symbols.

In method step 404, the processor 38 identifies a subset 124 of the plurality of virtual reel strips 102-110 to include a plurality of modifiable symbol positions 126 that are configured to display special symbols 128. In method step 406, the processor 38 accesses the wild symbol selection data file 129 and randomly selects a special symbol 128 from the group of special symbols 128 using random numbers. For example, the processor 38 randomly selects one of the special symbols 128, "Wild 1", Wild 2", or "Wild 3" based on the selection probabilities or random number ranges associated with each special symbol 128.

In method step 408, the processor 38 populates each modifiable symbol position 126 by inserting the randomly selected special symbol 128 into each modifiable symbol position 126 such that each modifiable symbol position 126 displays the same special symbol 128. The processor 38 also populates each fixed symbol position 120 by accessing the fixed game symbol image data file 118 and retrieving the game symbols 90 associated with each of the fixed symbol position 120 and displaying the retrieved game symbol 90 in each associated fixed symbol position 120.

In one embodiment, the processor 38 may also be programmed to generate at least one of the plurality of virtual reels 76-84 without modifiable symbol positions 126. For example, as shown in FIG. 15. the processor 38 may be programmed to generate the 2nd, 3rd, and 4th, virtual reels 78, 80, 82 using reel strips 104, 106, 108 to include modifiable symbol positions 126 to display the randomly selected special symbol 128, and to generate the 1st and 5th virtual reel 76, 84 using reels strips 102, 110 without modifiable symbol positions 126 such that special symbols 128 only appear in the 2nd, 3rd, and 4th, virtual reels 78, 80, 82.

In method step 410, the processor 38 determines whether to include a multiplier wild symbol 252 (shown in FIGS. 27A-27B) with one or more of the subset of virtual reels 124. If a multiplier wild symbol 252 is being included, the processor 38 executes method step 412 and randomly selects one or more of the virtual reels 76-84 included in the subset of virtual reels 124, and replaces each special symbol 128 being displayed in the selected virtual reels with a multiplier wild symbol 252 associated with the selected special symbol 128. For example, when generating the virtual reels and prior to spinning the reels, the processor 38 may randomly select one or more of the subset of virtual reels 124, and replace each wild symbol with a corresponding 2× wild multiplier symbol having similar image characteristics.

In method step 414, processor 38 then renders the virtual reels 76-84 and displays the generated plurality of virtual reels 76-84 in the primary game area 72.

Figure 11:
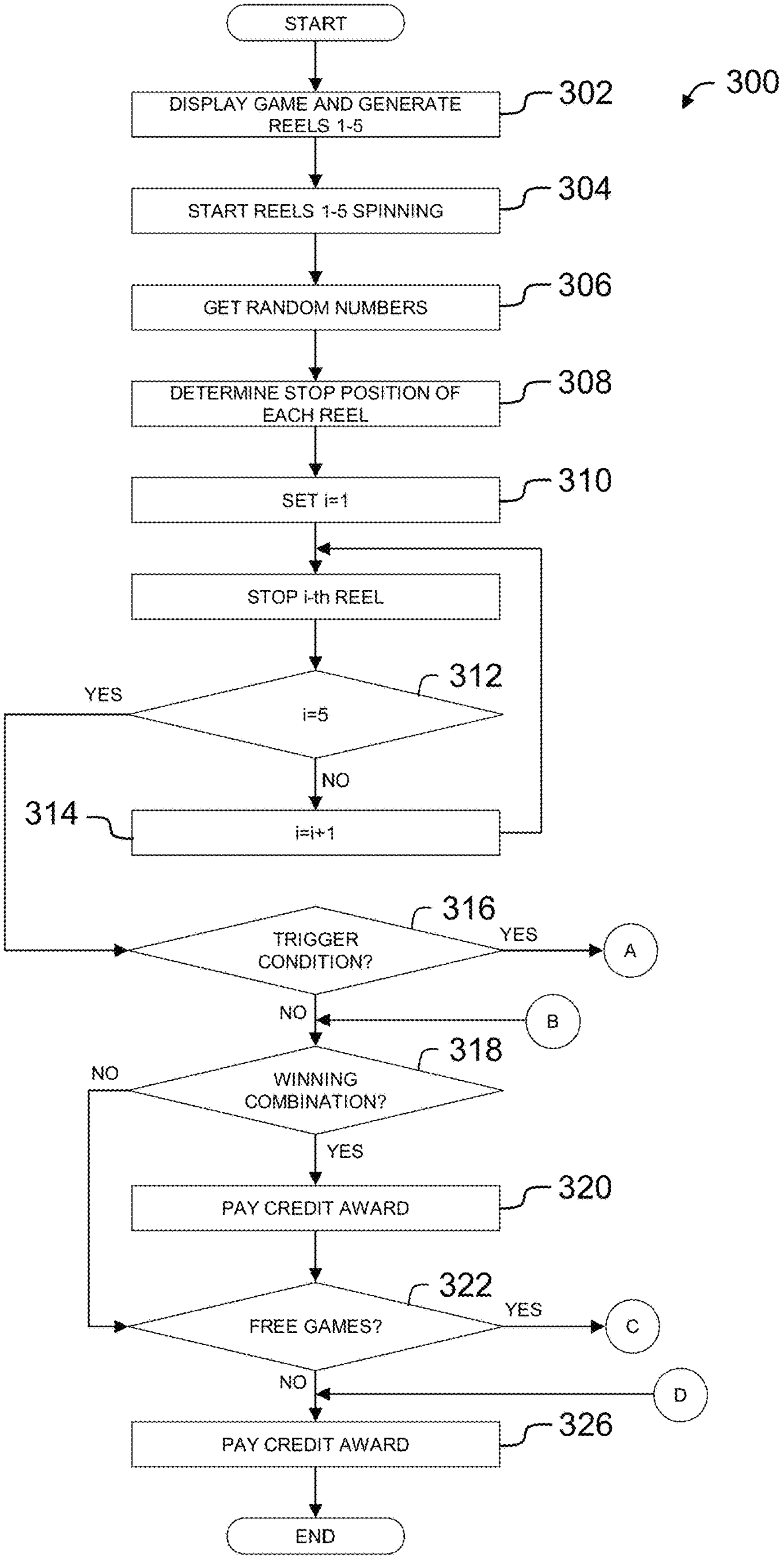
FIGS. 11-14 are flow charts illustrating the algorithms used during operation of the gaming machine and/or the mobile computing device to execute the game shown in FIG. 3A-3B, according to one embodiment of the present invention.
Figure 25C:
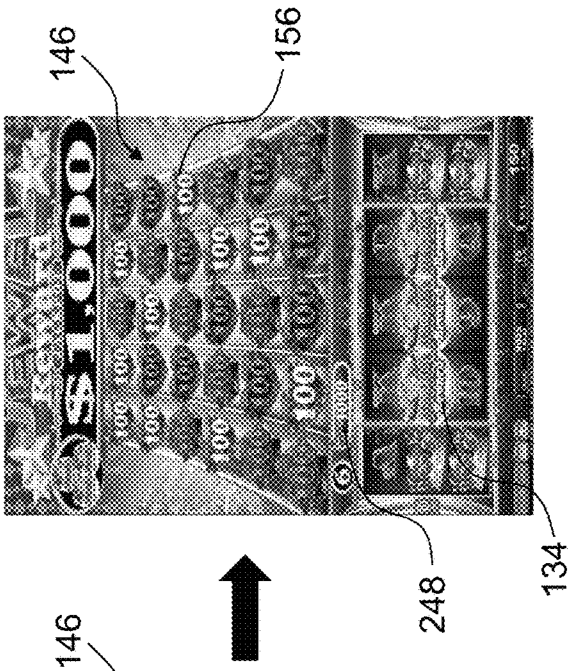
Figure 25B:
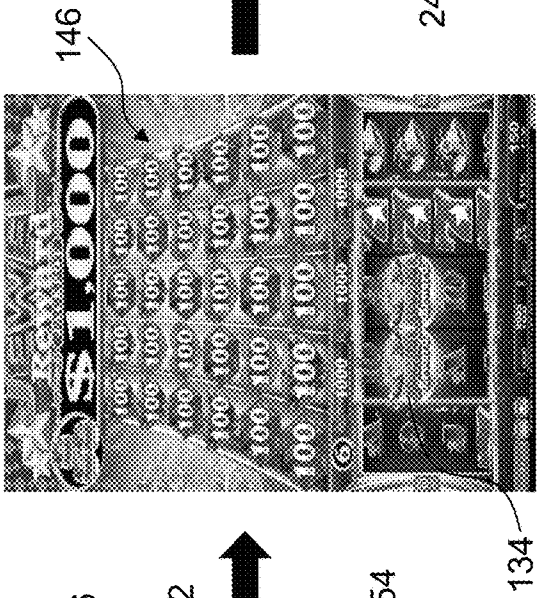
Figure 25A:
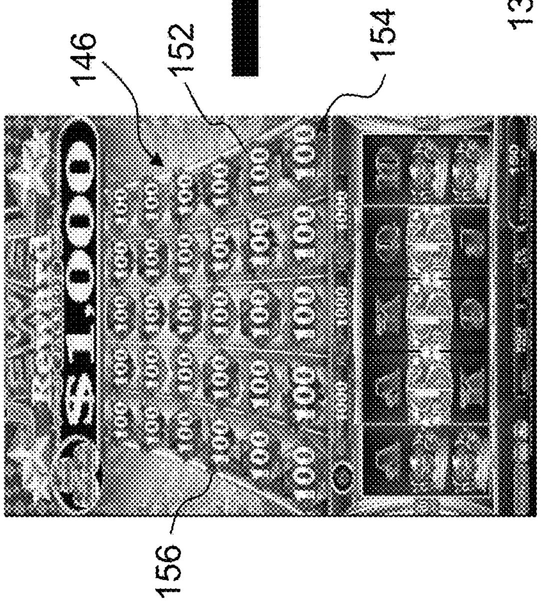

Referring to FIG. 11, in method steps 304-314, the processor 38 randomly determines an outcome of an instance of the primary game 68 and spins the virtual reels 76 to 84 (as shown in FIGS. 25A-25C) and sequentially stops the virtual reels 76 to 84 to display the randomly generated outcome including a game symbol being displayed in each cell 88 of the grid 86. For example, in one embodiment, the processor 38 starts spinning each virtual reel 76 to 84, obtains random numbers from the random number generator, and determines a stop position of each virtual reel 76 to 84 based on the random numbers and the reel stop position data file 140. In the illustrated embodiment the reel stop position data file 140 includes a range of random numbers associated with each symbol position in the sequence of symbol positions associated with the virtual reel. In one embodiment, the processor may obtain a random number for each simulate virtual reel 76 to 84, i.e., five random numbers. The processor 38 then establishes a reel stop counter, "i", and sets the reel stop counter, i, equal to 1. The processor 38 then identifies the ith virtual reel strip associated with the stop counter, i, and stops the identified virtual reel strip to display the corresponding symbols in the corresponding cells 88 associated with the identified virtual reel strip. The processor 38 then increments the reel stop counter, i, by 1, i.e., 1=1+1, and repeats the process of identifying the virtual reel strip associated with the incremented reel stop counter and stopping the identified virtual reel strip. This process continues until each virtual reel strip has been stopped. In this embodiment, for example, the virtual reel strips are numbered 1-5. In one embodiment, during the reel spin, the player may initiate the stopping of the reels by depressing the spin button, which enables the player to accelerate game play.

Figure 28A:
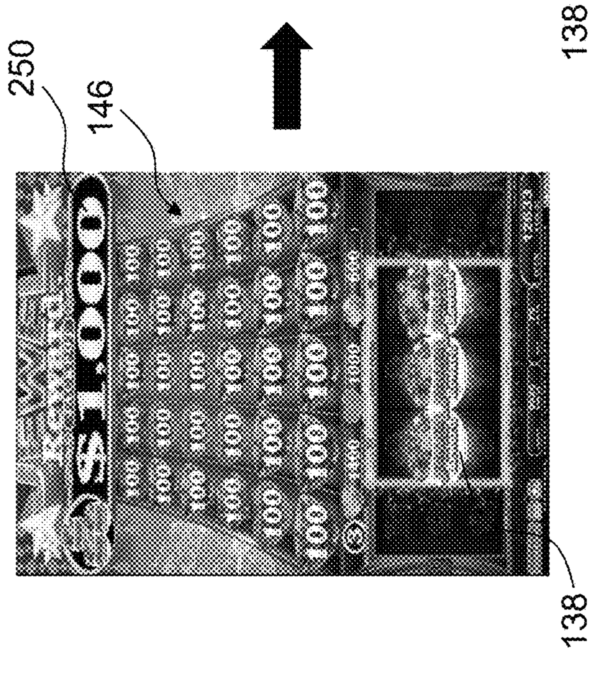
Figure 28B:
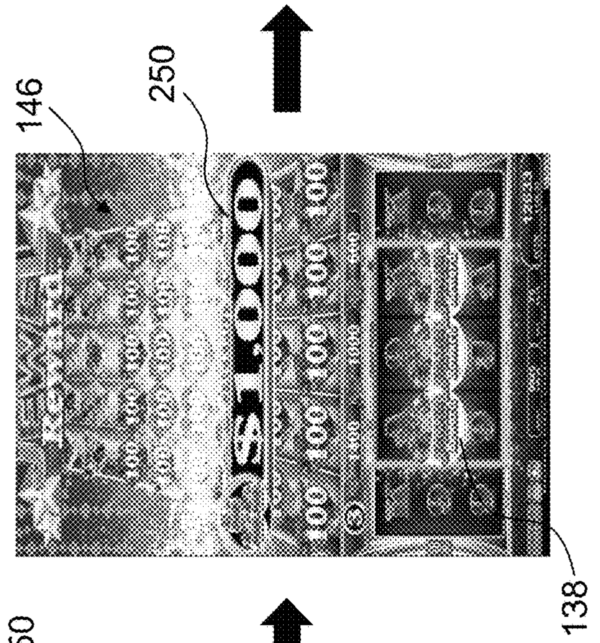
Figure 28C:
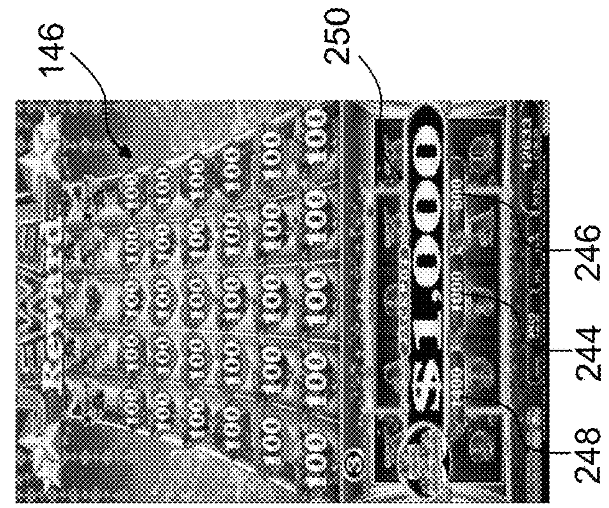
Figures 29A, 29B, 29C, 29D:
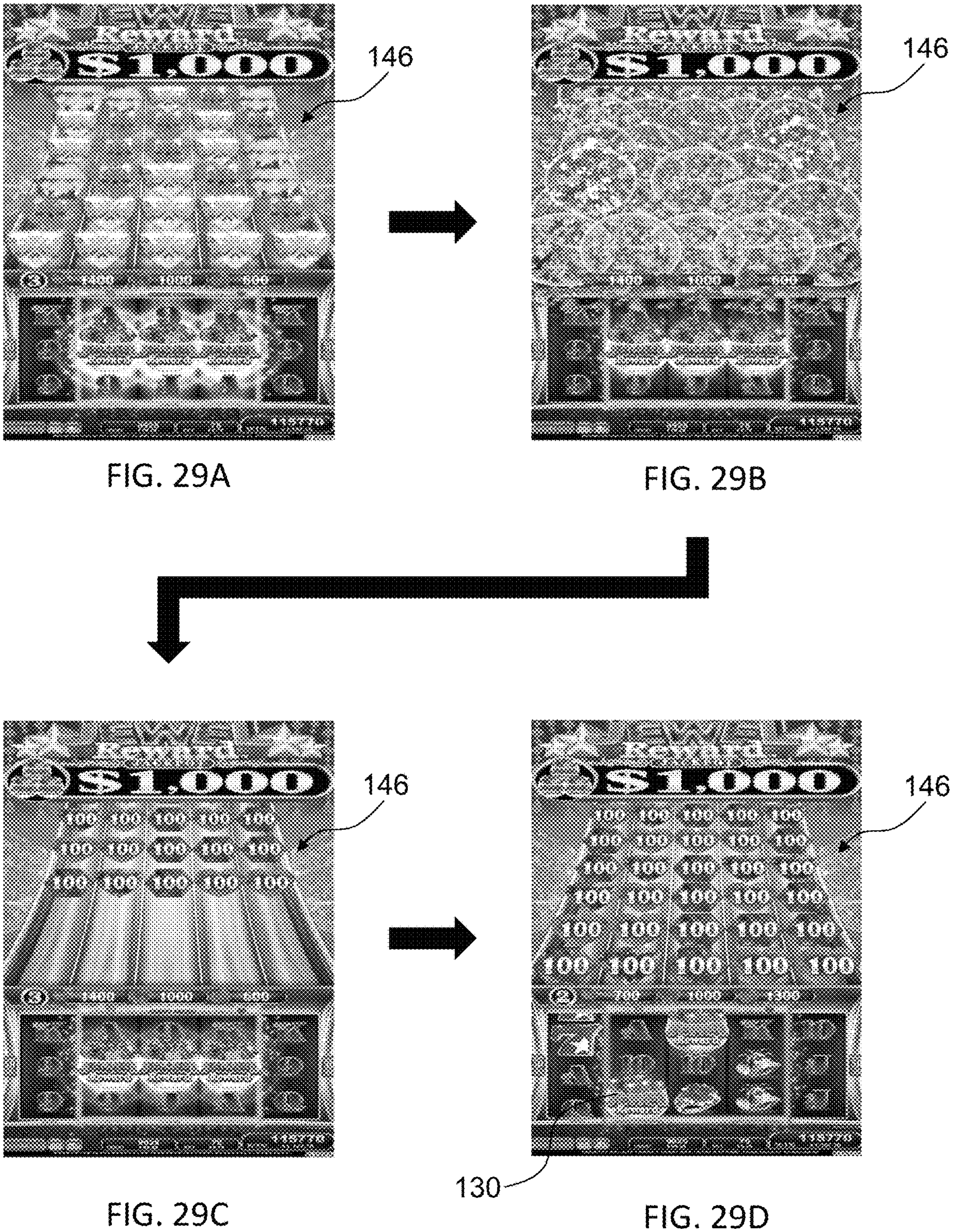

In method step 316, upon stopping the virtual reels 76 to 84, the processor 38 determines if a trigger condition has been detected in the outcome of the primary game 68. If a trigger condition is detected during the primary game 68, the processor 38 initiates the bonus feature event 70 by executing the algorithm illustrated in method 500 (shown in FIG. 13). In the illustrated embodiment, the trigger condition includes the selected special symbol 128 being displayed in each virtual reel 74-84 of the subset of virtual reels 124, with the virtual reels stopped. For example, as shown in FIG. 3B, the primary game grid 86 is displayed with a win frame 254 extending across the cells 88 associated with the 2nd, 3rd, and 4th virtual reels 78, 80, 82. In this example, the trigger condition includes the appearance of the "Wild 3" symbol in the 2nd, 3rd, and 4th virtual reels 78, 80, 82 within the win frame 254 when the virtual reels 76-84 are stopped. In addition, as shown in FIG. 28A-28C, another trigger condition may include the extra special symbol 138 appearing in the 2nd, 3rd, and 4th virtual reels 78, 80, 82 when the virtual reels 76-84 are stopped. The trigger condition may also require each wild symbol being displayed on the same payline and/or the same row of cells 88.

In method step 502, upon initiating the bonus feature event 70, the processor 38 identifies the credit prize symbols 146 that are associated with the wild symbol being displayed with the trigger condition. For example, as shown in FIG. 25C, the trigger condition includes the appearance of three "Wild 3" symbols in the outcome of the primary game 68. The processor 38 identifies the "Credit Symbol 3" symbols 134 displayed in the bonus feature event area 74.

In method step 504, the processor 38 determines an amount of credits based on the credit value of each displayed credit prize symbol associated with the displayed wild symbol. For example, as shown in FIG. 25C, the processor determines the third credit prize amount 248 associated the "Wild 3" symbol 134.

Figure 27A:
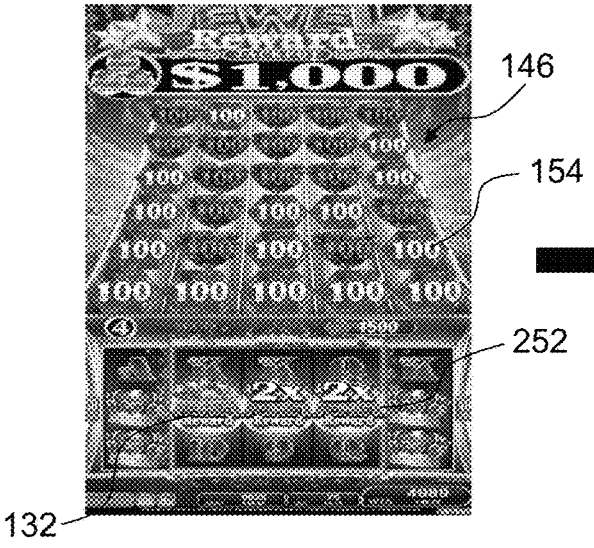
Figure 27B:
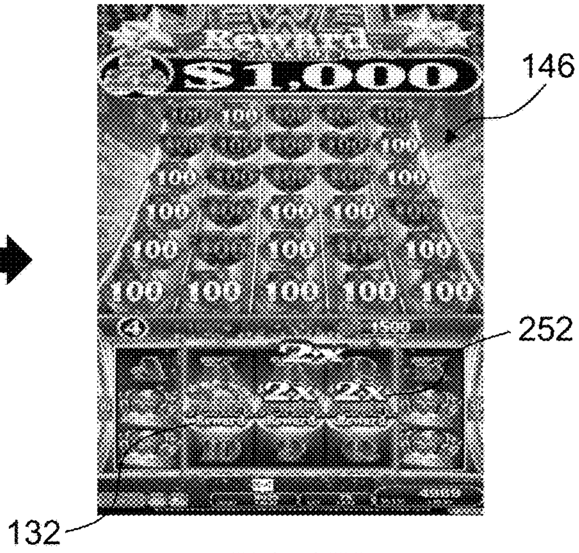
Figure 27C:
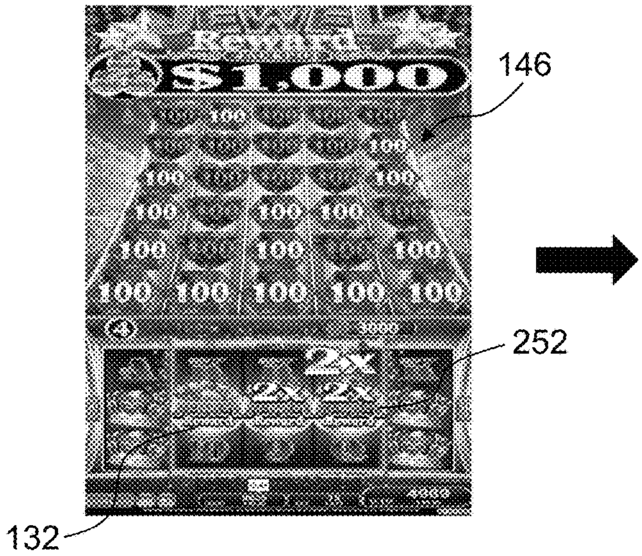
Figure 27D:
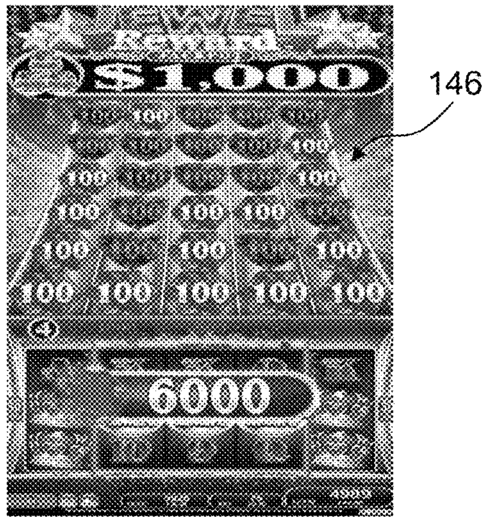

In method steps 506-508, the processor 38 detects an appearance of any multiplier wild symbols 252 being displayed in the outcome and multiplies the determined amount of credits by a multiplier value associated with the displayed multiplier wild symbol. For example, as shown in FIGS. 27A-27D, the processor 38 identifies two multiplier wild symbols appearing the outcome of the primary game 68 and multiplies the determined amount of credits by each multiplier value. As shown in FIG. 27D, the initial credit prize amount was 1500 credits. Upon detecting the appearance of two 2× multiplier symbols, the processor 38 multiplied the initial credit prize by each multiplier value, resulting in a final credit prize amount equal to 6000 credits (e.g., 1500×2×2=6000).

In method step 510, the processor 38 provides the player a bonus credit award based on the determined amount of credits calculated at step 504 or step 508.

Figure 26A:
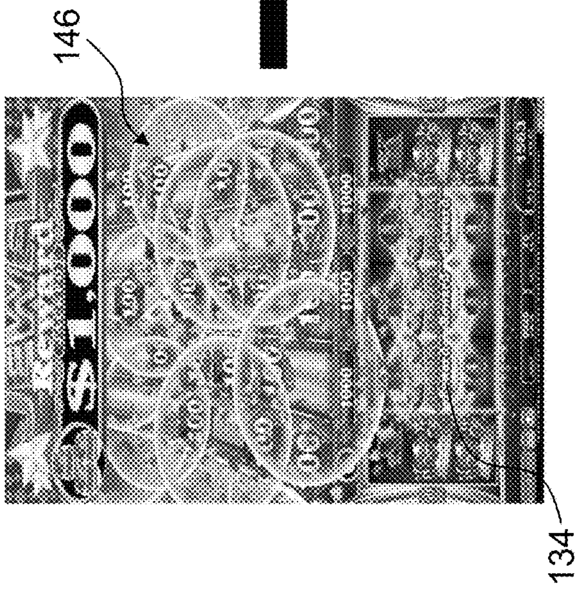
Figure 26B:
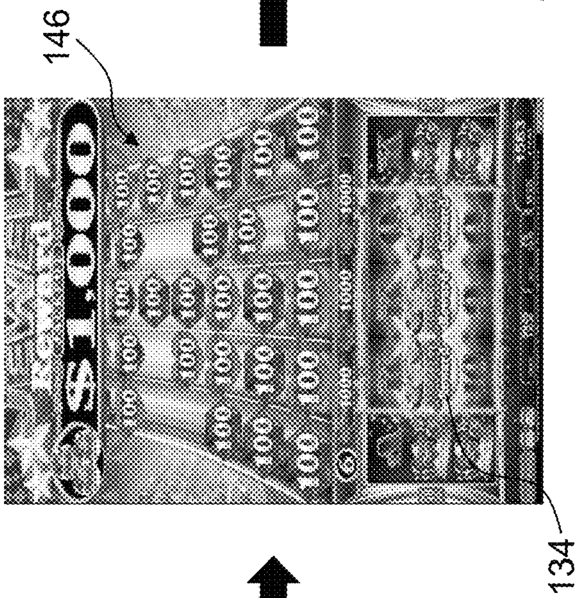
Figure 26C:
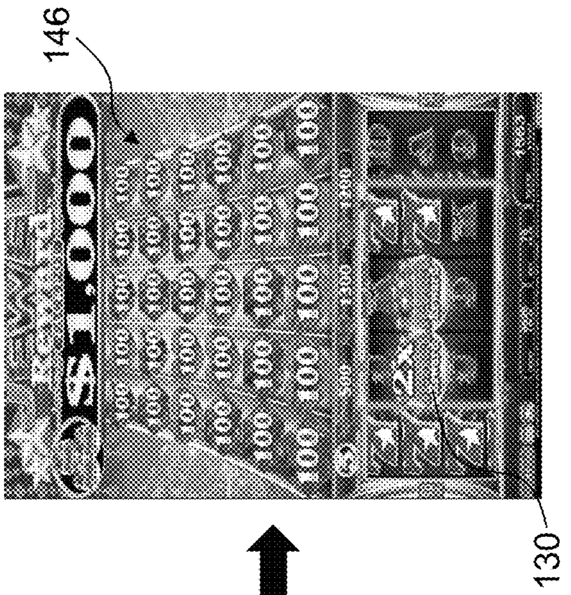

In method step 512, upon providing the bonus credit award to the player, the processor 38 then removes each displayed credit prize symbol associated with the displayed wild symbol from the bonus feature event area 74. For example, as shown in FIGS. 26A-26C, because "Wild 3" symbol 134 is displayed as the trigger condition, the processor 38 removes each "Credit Symbol 3" symbol 156 being displayed in the bonus feature event grid 148.

In method steps 514, the processor 38 determines a number of credit prize symbols 146 being removed, selects a corresponding amount of random numbers, and accesses the credit prize symbol selection data file 158 to use the random numbers to randomly select replacement credit prize symbols 146. In one embodiment, the processor 38 may determine the replacement credit symbol so as to keep a condition that at least one credit prize symbol associated with each wild/special symbol is displayed in the bonus feature event area 74. In this way, it is possible to avoid triggering a bonus feature event without bonus credit award.

In method step 516, the processor 38 displays the randomly selected credit prize symbols 146 in the bonus feature event grid 148. For example, as shown in FIGS. 26A-26C, in one embodiment the processor 38 removes each displayed credit prize symbol associated with the displayed wild symbol from the bonus feature event grid 148, animates the remaining credit prize symbols as "cascading" downward into emptied cells, and "cascades" the replacement credit prize symbols 146 into the remaining empty cells.

Upon replacing the removed credit prize symbols 146, the processor 38 then recalculates the credit prize amounts 244, 246, 248, based on the credit prize symbols 146 currently displayed on the bonus feature event grid 148.

In one embodiment, the trigger condition may include the extra special symbol 138 appearing in the 2nd, 3rd, and 4th virtual reels 78, 80, 82 when the virtual reels 76-84 are stopped. If the special wild symbol trigger condition occurs, the processor 38 is programmed to provide a jackpot credit prize award upon detecting a plurality of special wild symbols appearing in the outcome of the game. The jackpot credit prize award includes a sum of credit values associated with each credit prize symbol 146 displayed in the bonus feature event area 74 and the jackpot credit value 250. For example, as shown in FIGS. 28A-28C, if the extra special symbol 138 appears in each of the 2nd, 3rd, and 4th virtual reels 78, 80, 82, the processor 38 animates the jackpot credit value 250 down towards each of the credit prize amounts 244, 246, 248, and provides the jackpot credit prize award including an amount of credits equal to the sum of the credit prize amounts 244, 246, 248 and the jackpot credit value 250. As shown in FIGS. 29A-29D, upon providing the jackpot credit prize award, the processor 38 removes all the credit prize symbols 146 displayed in the bonus feature event grid 148, randomly selects new credit prize symbols 146, and "cascades" the new credit prize symbols 146 into the emptied cells 150.

Referring to FIG. 11, in method step 318, the processor 38 determines whether any winning combination of symbols is displayed in the outcome of the instance of the primary game 68, and determines a primary credit award based on the game symbols displayed in the outcome and a paytable including a list of winning combination of game symbols and associated primary credit awards.

In method step 320, the processor 38 is programmed to provide the primary credit award and the bonus credit award to the player and adjust a credit amount displayed in the credit meter.

In method step 322, the processor 38 determines whether any free games are awarded to the player. For example, in one embodiment, the processor 38 may award 7 free games if one or more "Scatter" symbols appear in the outcome of the primary game 68. If free games are awarded to the player, the processor 38 executes the algorithm illustrated in method 600 (shown in FIG. 14).

In method step 602 the processor 38 generates the virtual reels 76-84 using the free game reel strip data file 96 (shown in FIG. 16) and executing method steps 402-414. In method steps 604-628, the processor 38 determines an n number of free games being provided, and for each free game, executes steps similar to method steps 604-6210, including detecting whether a trigger condition appears in an outcome of the free game and executing method 500 to initiate the bonus feature event 70, and whether any additional free games are to be awarded. In method steps 626-628, the processor 38 determines whether any free games remain, and repeats steps 604-624 for any remaining free games. In the illustrated embodiment, the virtual reels 76-84 generated for the initial free game are used for each of the awarded number of free games.

Referring to FIG. 11, in method step 326 the processor 38 provides any credit awards received during the free games.

In the illustrated embodiment, upon the completion of a first instance of the primary game 68, including the bonus feature event and any free games, the processor 38 may receive another signal to initiate a second instance of the game 66. Upon receiving a signal to initiate a second instance of the game 66, the processor 38 executes method 300 including randomly selecting another wild symbol from the group of wild symbols for use in generating the virtual reels 76-84, inserting the selected another wild symbol into each modifiable symbol position, and spinning and stopping the another set of virtual reels to display an outcome of the second instance of the game. For example, the processor 38 may be programmed to select the special symbols 128 anew for each instance of the game 66.

In one embodiment, the game 66 is included in a slot machine game such as, for example, "Jewel Reward™ published by Konami Gaming. Jewel Reward™ includes a five-reel slot game with multiple paylines arranges in a 3-3-3-3-3 grid. The Jewel Reward™ slot game includes a Jewel Reward Feature™ bonus feature event and a free game feature. In one embodiment, the game 66 may include a fixed 50 Line only (+25 Extra Bet), multiple lines 3-3-3-3-3 video slot product. Each of the credit prize values on the jewels is 100 times the bet per line. The jackpot bonus value is 100000 times the bet per line. Wild Color weight is same each color (Red, Blue or Green). The number of Jewels is 30. The credit prize and the jackpot bonus is award by Jewel Reward Feature (as below). The free game is triggered by Scattered any 3 "Scatter", where when triggered, players take 7 free games. During the free games, Jewel Reward Feature can frequently occur (average twice at one free game feature), and any 1, 2 or 3 "Scatter" award 1, 2 or 3 additional free games respectively. Volatility is change by each jewel color state. Above volatility index is average all persistent state. For example, Red 10, Blue 10, Green 10 equals low volatility, with average win of Red 1523, Blue 1523, Green 1523 credits; and Red 28, Blue 1, Green 1 equals high volatility, with average win of Red 4264, Blue 152, Green 152 credits. The state is changed by Jewel Reward Feature.

Primary Game functionally: Jewel Reward Feature and Free Game Feature can be triggered. If 1 of "red 2× wild", "blue 2× wild" or "green 2× wild" substitutes in a win, it will multiply the pay for that win 2×. If 2 of "red 2× wild", "blue 2× wild" or "green 2× wild" substitutes in a win, they will multiply the pay for that win 4×. If 3 of "red 2× wild", "blue 2× wild" or "green 2× wild" substitutes in a win, they will multiply the pay for that win 8×.

Feature Game Functionally, Jewel Reward Feature: Any 3 "red wild" award all credit prizes displayed on "red jewel". Any 3 "blue wild" award all credit prizes displayed on "blue jewel". Any 3 "green wild" award all credit prizes displayed on "green jewel". Any 3 "white wild" award jackpot bonus and all credit prizes displayed on "red jewel", "blue jewel" and "green jewel". Each of the credit prize values on the jewels is 100 times the bet per line. The jackpot bonus value is 100000 times the bet per line. Reels 2, 3 and 4 contain a number of positions that are randomly replaced with one of the following: "red wild", "blue wild" or "green wild" before the reel spin is initiated. For each reel, all replacement positions on that reel will be filled with the same symbol. Randomly, all "red wild" on reels 2, 3 and/or 4 change to "red 2× wild". Randomly, all "blue wild" on reels 2, 3 and/or 4 change to "blue 2× wild". Randomly, all "green wild" on reels 2, 3 and/or 4 change to "green 2× wild". After the credit prizes are paid, the corresponding jewel(s) are eliminated, and "red jewel", "blue jewel" and/or "green jewel" appear randomly on the screen.

Free Game: Any 3 "Scatter" trigger 7 Free games. During the free games, any 1, 2 or 3 "Scatter" award 1, 2 or 3 additional free games respectively. Different reels are used during the free games. Credits bet and lines played are the same as the game that triggered the free game feature. The Jewel Reward Feature can be triggered during the free games. Reels 2, 3 and 4 contain a number of positions that are randomly replaced with one of the following: "red wild", "blue wild" or "green wild" before the reel spin is initiated. For each reel, all replacement positions on that reel will be filled with the same symbol.

Jewel Reward Feature Chance Effect: When the chance of any 3 same color wild symbols stop is high, Jewel Reward Feature chance effect may happens. This chance effect happens just after the spin button pressed. Reel Frame and Jewels side is changed Red, Blue or Green. When Reels 2nd and 3rd is same color wild symbols stop, Jewels are tone down except the color associated with the wild symbols.

Jewel Reward Feature Won Effect: The won decoration calls the banner according to the amount of the winning jewel (shown in FIGS. 3A-3B and FIGS. 25A-29D). When credits prize amount is 1250 or more, total win meter expand in front. When wild symbols with "2×" exist, total win meter is multiplied (shown in FIG. 27D). The jewels that won the prize together with the coins will also add to celebration effect.

Jewel Elimination Effect: After the credit prizes are paid, the corresponding jewel(s) are eliminated, and "red jewel", "blue jewel" and/or "green jewel" appear randomly on the screen (shown in FIGS. 29A-29D).

Jackpot Bonus: When "white wild" stop on reels 2 and 3, jackpot bonus reach effect happens. When jackpot bonus will hit, the jackpot meter goes down in front of player. The Red, Blue and Green jewels together with the coins add to celebration effect (shown in FIG. 28A-28C).

Big Win Effect: During Jewel Reward Feature Chance Effect, may happen reel shaking and simultaneous stop. The effect occurs following conditions. Wild color on reels 2, 3 and 4 are same color. Total credit prize won is 1500 or more (total bet 20× or more at minimum bet). The credit prize won is includes 1 or more multiplier. One-half of the above three conditions.

In such an embodiment, a gaming machine 10 providing a game in the form of a slot machine is described, but this is not limited thereto, and a game in the state of poker, a video card game called black jack, bingo, keno, a wheel game and the like may be provided. Further, it is possible to apply the present invention to a pachinko machine or a pachinko slot machine.

In the embodiment, determining the stop position of each reel is described as consecutively acquiring a random number that is used respectively, but the acquisition procedure of the random number is not limited to this. For example, when the game starts, the control unit 22 acquires these random numbers in a batch, and each random number may be stored in the storage area of the non-erasing memory 42 or the storage 44 when power failure occurs. In this type of situation, even when a power failure and the like occurs during a game, because the control unit 22 acquired the random number from the memory 42 or the storage 44 when the game started before the power failure occurred, when resuming the game after recovering from a power failure, the progress of the game can be reproduced. For example, when a game result obtaining a high payout is formed right before a power failure occurs, the player will be greatly dissatisfied if the progress of the game is not similar after recovering from a power failure. However, as mentioned above when the game starts all of the random numbers are acquired in a batch, and by saving these random numbers in the memory 42 or the storage 44, such great dissatisfaction can be avoided for the player because the progress of a game similar to before a power failure occurred can be reproduced after recovering from a power failure.

In another embodiment, the player may initiate a game through actuation of a spin button (or other button). After initiation of the game, the control unit 22 randomly determines the step position of all reels. The control unit 22 may perform the check for the trigger condition before the reels stop spinning, and thus has already determined the outcome of the game. However, the control unit 22 displays the outcome of the game in a step by step process as discussed above.

Further, in the embodiment, a bill/ticket is displayed as game value, and received by these bill/ticket identification devices, and a form where a ticket is output by a printer device 30 is described, but the present invention is not limited to this. The game value is a concept including tangible objects such as a coin, bill, medal, ticket, and the like, or electronic data that has a value equivalent to these. For example, a coin is received by the coin accepter, and there may be a form where a coin is paid by a coin hopper. A player is identified and credit that is accumulated in an account on a server is used, there may be a form where credit is paid to an account, information of credit stored in a storage medium of a magnetic card, IC card and the like is read and used, and there may be a form where credit is paid by writing to the storage medium.

Further, in the embodiment when showing a free game provided as a bonus game, a bonus game that uses a different virtual reel strips from a regular game may be provided. Further, there could be a provided a feature game according to a value of the random number acquired during a regular game.

Further, set conditions providing a bonus or feature game are not limited to trigger determination or line determination, for example there may be a configuration providing a bonus game when the bet number surpasses a predetermined value. There could be a configuration providing a bonus game according to a value of the random number acquired during a regular game.

Exemplary embodiments of a gaming device, a gaming system, and a method of providing an award to a player are described above in detail. The gaming device, system, and method are not limited to the specific embodiments described herein, but rather, components of the gaming device and/or system and/or steps of the method may be utilized independently and separately from other components and/or steps described herein. For example, the gaming device may also be used in combination with other gaming systems and methods, and is not limited to practice with only the gaming device as described herein. Rather, an exemplary embodiment can be implemented and utilized in connection with many other gaming system applications.

A controller, computing device, or computer, such as described herein, includes at least one or more processors or processing units and a system memory. The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In some embodiments, a processor, as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Other aspects and features of the present invention can be obtained from a study of the drawings, the disclosure, and the appended claims. The invention may be practiced otherwise than as specifically described within the scope of the appended claims. It should also be noted, that the steps and/or functions listed within the appended claims, notwithstanding the order of which steps and/or functions are listed therein, are not limited to any specific order of operation.

Although specific features of various embodiments of the invention may be shown in some drawings and not in others, this is for convenience only. In accordance with the principles of the invention, any feature of a drawing may be referenced and/or claimed in combination with any feature of any other drawing.

What is claimed is:

1. A gaming machine, comprising:

a cabinet;

a display device mounted to the cabinet; and a processor programmed to execute an algorithm to render an animated sequence of computer-generated images on the display device to display a game including the steps of:

displaying a primary game area on the display device including a plurality of virtual reels;

displaying a bonus feature event area on the display device including a plurality of credit prize symbols arranged in a plurality of rows and a plurality of columns;

displaying each of the plurality of credit prize symbols with an associated credit value by:

establishing a same credit value based on a bet denomination value associated with the game; and displaying each credit prize symbol with the same credit value; and initiating an instance of a game by:

spinning and stopping the plurality of virtual reels to display a special symbol;

selecting credit prize symbols associated with the displayed special symbol;

determining an amount of credits based on the associated credit value of each selected credit prize symbol;

providing an award based on the determined amount of credits; and animating the selected credit prize symbols to remove the selected credit prize symbols from the bonus feature event area.

2. The gaming machine of claim 1, wherein the processor is programmed to execute the algorithm including the steps of:

selecting replacement credit prize symbols to display in the bonus feature event area;

animating remaining credit prize symbols to cascade downward to fill emptied positions in the bonus feature event area; and animating the selected replacement credit prize symbols to cascade downward into remaining empty positions in the bonus feature event area.

3. The gaming machine of claim 1, wherein at least one virtual reel includes a modifiable symbol position, the processor is programmed to execute the algorithm including the steps of:

randomly selecting the special symbol from a group of special symbols; and initiating the instance of the game with the at least one virtual reel including the selected special symbol displayed in the modifiable symbol position.

4. The gaming machine of claim 1, wherein the processor is programmed to execute the algorithm including the steps of:

displaying each credit prize symbol as one of a plurality of types of credit prize symbols, each type of credit prize symbol having an associated color.

5. The gaming machine of claim 1, wherein the processor is programmed to execute the algorithm including the steps of:

spinning and stopping the plurality of virtual reels to display an extra special symbol;

animating each of the plurality of credit prize symbols to remove each of the plurality of credit prize symbols from the bonus feature event area; and animating replacement credit prize symbols to cascade downward into empty positions of the bonus feature event area.

6. A method of operating a gaming machine including a display device mounted to a cabinet, and a processor operably coupled to the display device, the method including the processor performing an algorithm to render an animated sequence of computer-generated images on the display device to display a game including the steps of:

displaying a primary game area on the display device including a plurality of virtual reels;

displaying a bonus feature event area on the display device including a plurality of credit prize symbols arranged in a plurality of rows and a plurality of columns;

displaying each of the plurality of credit prize symbols with an associated credit value by:

establishing a same credit value based on a bet denomination value associated with the game; and displaying each credit prize symbol with the same credit value; and initiating an instance of a game by:

spinning and stopping the plurality of virtual reels to display a special symbol;

selecting credit prize symbols associated with the displayed special symbol;

determining an amount of credits based on the associated credit value of each selected credit prize symbol;

providing an award based on the determined amount of credits; and animating the selected credit prize symbols to remove the selected credit prize symbols from the bonus feature event area.

7. The method of claim 6, including the processor performing the algorithm including the steps of:

selecting replacement credit prize symbols to display in the bonus feature event area;

animating remaining credit prize symbols to cascade downward to fill emptied positions in the bonus feature event area; and animating the selected replacement credit prize symbols to cascade downward into remaining empty positions in the bonus feature event area.

8. The method of claim 6, wherein at least one virtual reel includes a modifiable symbol position, the method including the processor performing the algorithm including the steps of:

randomly selecting the special symbol from a group of special symbols; and initiating the instance of the game with the at least one virtual reel including the selected special symbol displayed in the modifiable symbol position.

9. The method of claim 6, including the processor performing the algorithm including the steps of:

displaying each credit prize symbol as one of a plurality of types of credit prize symbols, each type of credit prize symbol having an associated color.

10. The method of claim 6, including the processor performing the algorithm including the steps of:

spinning and stopping the plurality of virtual reels to display an extra special symbol;

animating each of the plurality of credit prize symbols to remove each of the plurality of credit prize symbols from the bonus feature event area; and animating replacement credit prize symbols to cascade downward into empty positions of the bonus feature event area.

11. A non-transitory computer-readable storage media having computer-executable instructions embodied thereon, when executed by at least one processor the computer-executable instructions cause the at least one processor to perform an algorithm to render an animated sequence of computer-generated images to display a game including the steps of:

displaying a primary game area on a display device including a plurality of virtual reels;

displaying a bonus feature event area on the display device including a plurality of credit prize symbols arranged in a plurality of rows and a plurality of columns;

displaying each of the plurality of credit prize symbols with an associated credit value by:

establishing a same credit value based on a bet denomination value associated with the game; and displaying each credit prize symbol with the same credit value; and initiating an instance of a game by:

spinning and stopping the plurality of virtual reels to display a special symbol;

selecting credit prize symbols associated with the displayed special symbol;

determining an amount of credits based on the associated credit value of each selected credit prize symbol;

providing an award based on the determined amount of credits; and animating the selected credit prize symbols to remove the selected credit prize symbols from the bonus feature event area.

12. The non-transitory computer-readable storage media of claim 11, wherein the computer-executable instructions cause the at least one processor to perform the algorithm including the steps of:

selecting replacement credit prize symbols to display in the bonus feature event area;

animating remaining credit prize symbols to cascade downward to fill emptied positions in the bonus feature event area; and animating the selected replacement credit prize symbols to cascade downward into remaining empty positions in the bonus feature event area.

13. The non-transitory computer-readable storage media of claim 11, wherein the computer-executable instructions cause the at least one processor to perform the algorithm including the steps of:

spinning and stopping the plurality of virtual reels to display an extra special symbol;

animating each of the plurality of credit prize symbols to remove each of the plurality of credit prize symbols from the bonus feature event area; and animating replacement credit prize symbols to cascade downward into empty positions of the bonus feature event area.

* * * * *